(12) United States Patent
Kooken et al.

(10) Patent No.: US 8,581,147 B2
(45) Date of Patent: *Nov. 12, 2013

(54) THREE STAGE POWER SOURCE FOR ELECTRIC ARC WELDING

(75) Inventors: Todd E. Kooken, University Heights, OH (US); Lifeng Luo, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1792 days.

This patent is subject to a terminal disclaimer.

(21) Appl. No.: 11/087,179

(22) Filed: Mar. 24, 2005

(65) Prior Publication Data

US 2006/0213890 A1 Sep. 28, 2006

(51) Int. Cl.
*B23K 9/00* (2006.01)
(52) U.S. Cl.
USPC ............. 219/137.7; 219/130.51; 219/130.1; 219/130.21
(58) Field of Classification Search
USPC ............... 219/130.1, 130.5, 137.7, 137 PS
See application file for complete search history.

(56) References Cited

U.S. PATENT DOCUMENTS

| | | |
|---|---|---|
| 3,459,920 A | 8/1969 | Sevenco |
| 3,737,755 A | 6/1973 | Calkin |
| 3,809,853 A | 5/1974 | Manz |
| 3,904,846 A | 9/1975 | Risberg |
| 3,984,799 A | 10/1976 | Fletcher et al. |
| 4,020,320 A | 4/1977 | Pijls |
| 4,020,361 A | 4/1977 | Suelzle |
| 4,049,946 A | 9/1977 | Fluckiger |
| 4,125,759 A | 11/1978 | Kiyohara |
| 4,201,906 A | 5/1980 | Puschner |
| 4,245,285 A | 1/1981 | Weiss |

(Continued)

FOREIGN PATENT DOCUMENTS

| | | |
|---|---|---|
| AU | 2005-237177 | 11/2005 |
| CN | 1838517 | 9/2006 |

(Continued)

OTHER PUBLICATIONS

EP Search Report, EP 05 02 5646, Jan. 23, 2008, Enguerran Despis.

(Continued)

*Primary Examiner* — Henry Yuen
*Assistant Examiner* — Ayub Maye
(74) *Attorney, Agent, or Firm* — Perkins Coie LLP

(57) ABSTRACT

A three stage power source for an electric arc welding process comprising an input stage having an AC input and a first DC output signal; a second stage in the form of an unregulated DC to DC converter having an input connected to the first DC output signal, a network of switches switched at a high frequency with a given duty cycle to convert the input into a first internal AC signal, an isolation transformer with a primary winding driven by the first internal high frequency AC signal and a secondary winding for creating a second internal high frequency AC signal and a rectifier to convert the second internal AC signal into a second DC output signal of the second stage, with a magnitude related to the duty cycle of the switches; and, a third stage to convert the second DC output signal to a welding output for welding wherein the input stage has a regulated DC to DC converter with a boost power switch having an active soft switching circuit.

98 Claims, 15 Drawing Sheets

(56) References Cited

U.S. PATENT DOCUMENTS

| | | |
|---|---|---|
| 4,403,269 A | 9/1983 | Carroll |
| 4,409,465 A | 10/1983 | Yamamoto |
| 4,425,613 A | 1/1984 | Shelly |
| 4,433,370 A | 2/1984 | Karadsheh et al. |
| 4,442,339 A | 4/1984 | Mizuno |
| 4,442,370 A | 4/1984 | Veyssiere |
| 4,447,695 A | 5/1984 | Inoue |
| 4,485,293 A | 11/1984 | Tabata |
| 4,494,180 A | 1/1985 | Streater |
| 4,503,316 A | 3/1985 | Murase et al. |
| 4,518,844 A | 5/1985 | Needham |
| 4,521,671 A | 6/1985 | Fronius |
| 4,521,672 A | 6/1985 | Fronius |
| 4,533,986 A | 8/1985 | Jones |
| 4,540,892 A | 9/1985 | Carvalho |
| 4,546,234 A | 10/1985 | Ogasawara |
| 4,564,742 A | 1/1986 | Karlsson |
| 4,618,919 A | 10/1986 | Martin, Jr. |
| 4,635,181 A | 1/1987 | Bourgeault |
| 4,677,366 A | 6/1987 | Wilkinson |
| 4,677,667 A | 6/1987 | Burns |
| 4,720,667 A | 1/1988 | Lee |
| 4,720,668 A | 1/1988 | Lee et al. |
| 4,748,397 A | 5/1988 | Ogawa et al. |
| 4,779,184 A | 10/1988 | White |
| 4,855,888 A * | 8/1989 | Henze et al. .................. 363/17 |
| 4,857,822 A | 8/1989 | Tabisz et al. |
| 4,864,479 A | 9/1989 | Steigerwald |
| 4,866,247 A | 9/1989 | Parks |
| 4,889,969 A | 12/1989 | Kawai |
| 4,904,843 A | 2/1990 | Hori |
| 4,924,170 A | 5/1990 | Henze |
| 4,963,715 A | 10/1990 | Tuttle |
| 4,964,026 A | 10/1990 | Locascio |
| 5,001,326 A | 3/1991 | Stava |
| 5,001,623 A | 3/1991 | Magid |
| 5,008,295 A | 4/1991 | Nishino et al. |
| 5,008,795 A | 4/1991 | Parsley et al. |
| 5,019,952 A | 5/1991 | Smolenski |
| 5,066,900 A | 11/1991 | Bassett |
| 5,113,337 A | 5/1992 | Steigerwald |
| 5,130,561 A | 7/1992 | Elliott et al. |
| 5,149,933 A | 9/1992 | Donner |
| 5,172,309 A | 12/1992 | DeDoncker |
| 5,220,151 A | 6/1993 | Terayama et al. |
| 5,225,660 A * | 7/1993 | Mita et al. ................ 219/130.51 |
| 5,235,504 A | 8/1993 | Sood |
| 5,245,525 A | 9/1993 | Galloway et al. |
| 5,272,313 A | 12/1993 | Karino |
| 5,278,390 A | 1/1994 | Blankenship |
| 5,319,533 A | 6/1994 | Reynolds |
| 5,321,348 A | 6/1994 | Vinciarelli et al. |
| 5,343,017 A | 8/1994 | Karino |
| 5,343,140 A | 8/1994 | Gegner |
| 5,349,149 A | 9/1994 | Shiraki et al. |
| 5,349,157 A | 9/1994 | Blankenship |
| 5,349,159 A | 9/1994 | Mita et al. |
| 5,351,175 A | 9/1994 | Blankenship |
| 5,367,448 A * | 11/1994 | Carroll ........................ 363/89 |
| 5,402,060 A | 3/1995 | Erisman |
| 5,406,051 A | 4/1995 | Lai |
| 5,414,238 A * | 5/1995 | Steigerwald et al. ..... 219/121.54 |
| 5,414,613 A * | 5/1995 | Chen ............................ 363/52 |
| 5,418,704 A * | 5/1995 | Hua et al. ..................... 323/282 |
| 5,434,768 A | 7/1995 | Jitaru |
| 5,440,179 A | 8/1995 | Severinsky |
| 5,444,356 A | 8/1995 | Reynolds et al. |
| 5,465,011 A | 11/1995 | Miller |
| 5,477,131 A | 12/1995 | Gegner |
| 5,543,704 A | 8/1996 | Thoren |
| 5,601,741 A | 2/1997 | Thommes |
| 5,612,609 A | 3/1997 | Choi |
| 5,615,095 A | 3/1997 | Reynolds et al. |
| 5,615,098 A | 3/1997 | Ishii |
| 5,636,114 A | 6/1997 | Bhagwat et al. |
| 5,710,696 A | 1/1998 | Reynolds |
| 5,715,150 A | 2/1998 | Stava |
| 5,747,972 A | 5/1998 | Baretich et al. |
| 5,760,372 A | 6/1998 | Karino et al. |
| 5,771,163 A | 6/1998 | Moriguchi |
| 5,777,860 A | 7/1998 | Halbert |
| 5,786,992 A | 7/1998 | Vinciarelli |
| 5,790,389 A | 8/1998 | Hua |
| 5,796,595 A | 8/1998 | Cross |
| 5,811,757 A | 9/1998 | Higgins |
| 5,824,990 A | 10/1998 | Geissler |
| 5,825,642 A | 10/1998 | Ishii |
| 5,831,240 A | 11/1998 | Katooka |
| 5,847,942 A | 12/1998 | Bazinet et al. |
| 5,864,116 A | 1/1999 | Baker |
| 5,867,374 A | 2/1999 | Moreau |
| 5,874,826 A | 2/1999 | Chen |
| 5,875,104 A | 2/1999 | Prager |
| 5,894,414 A | 4/1999 | Jiang |
| 5,917,711 A | 6/1999 | Shikata |
| 5,926,381 A | 7/1999 | Moriguchi |
| 5,990,445 A | 11/1999 | Ogasawara et al. |
| 5,991,169 A | 11/1999 | Kooken |
| 5,991,180 A | 11/1999 | Vogel |
| 6,023,037 A * | 2/2000 | Church et al. ........... 219/121.39 |
| 6,023,154 A | 2/2000 | Martinez |
| 6,023,416 A | 2/2000 | Shikata |
| 6,031,737 A | 2/2000 | Green |
| 6,051,804 A | 4/2000 | Reynolds et al. |
| 6,051,806 A | 4/2000 | Shikata |
| 6,054,674 A | 4/2000 | Moriguchi |
| 6,055,161 A | 4/2000 | Church |
| 6,067,241 A | 5/2000 | Lu |
| 6,069,801 A | 5/2000 | Hodge |
| 6,069,811 A * | 5/2000 | Moriguchi et al. ........... 363/142 |
| 6,087,628 A | 7/2000 | Ferkel |
| 6,091,612 A | 7/2000 | Blankenship |
| 6,101,105 A | 8/2000 | Gilmore |
| 6,115,273 A | 9/2000 | Geissler |
| 6,177,645 B1 | 1/2001 | Church |
| 6,188,585 B1 | 2/2001 | Ikeda |
| 6,198,642 B1 | 3/2001 | Kociecki |
| 6,207,927 B1 * | 3/2001 | Mita et al. ................. 219/130.51 |
| 6,207,929 B1 | 3/2001 | Stava |
| 6,211,657 B1 | 4/2001 | Goluszek |
| 6,236,014 B1 | 5/2001 | Ulrich |
| 6,268,587 B1 | 7/2001 | Kooken |
| 6,278,080 B1 | 8/2001 | Moriguchi |
| 6,291,798 B1 | 9/2001 | Stava |
| 6,300,589 B1 | 10/2001 | Reynolds et al. |
| 6,329,636 B1 | 12/2001 | Geissler |
| 6,331,694 B1 | 12/2001 | Blankenship |
| 6,349,044 B1 | 2/2002 | Canales-Abarca |
| 6,353,547 B1 | 3/2002 | Jang |
| 6,365,874 B1 | 4/2002 | Stava |
| 6,366,476 B1 | 4/2002 | Yasumura |
| 6,384,373 B1 | 5/2002 | Schwartz |
| 6,469,921 B2 | 10/2002 | Arai |
| 6,472,634 B1 | 10/2002 | Houston et al. |
| 6,483,687 B2 | 11/2002 | Katooka |
| 6,501,049 B2 | 12/2002 | Stava |
| 6,504,132 B1 * | 1/2003 | Church ....................... 219/130.1 |
| 6,570,128 B1 | 5/2003 | Mela |
| 6,570,130 B1 | 5/2003 | Kooken |
| 6,600,134 B2 | 7/2003 | Stava |
| 6,618,274 B2 | 9/2003 | Boylan |
| 6,653,595 B2 | 11/2003 | Hutchison |
| 6,660,966 B2 | 12/2003 | Houston |
| 6,665,183 B1 | 12/2003 | Shikata |
| 6,683,278 B2 | 1/2004 | Stava |
| 6,710,299 B2 | 3/2004 | Blankenship |
| 6,713,721 B2 | 3/2004 | Albrecht |
| 6,717,107 B1 | 4/2004 | Hsu |
| 6,723,957 B2 | 4/2004 | Holverson |
| 6,750,637 B2 | 6/2004 | Nagaki et al. |
| 6,815,639 B2 | 11/2004 | Geissler |
| 2002/0125235 A1 | 9/2002 | Stava |
| 2002/0191425 A1 | 12/2002 | Geissler |
| 2003/0111451 A1 | 6/2003 | Blankenship et al. |

(56) References Cited

U.S. PATENT DOCUMENTS

| | | |
|---|---|---|
| 2006/0011595 A1 | 1/2006 | Daniel et al. |
| 2006/0175313 A1 | 8/2006 | Kooken et al. |
| 2006/0213890 A1 | 9/2006 | Kooken et al. |
| 2006/0226130 A1 | 10/2006 | Kooken et al. |
| 2006/0243716 A1 | 11/2006 | Stava et al. |
| 2007/0051712 A1 | 3/2007 | Kooken et al. |

FOREIGN PATENT DOCUMENTS

| | | |
|---|---|---|
| EP | 0704957 B1 | 1/1999 |
| EP | 0600268.0 | 5/1999 |
| EP | 1 616 654 A1 | 1/2006 |
| EP | 1615654 A | 1/2006 |
| EP | 1 688 203 A2 | 8/2006 |
| EP | 1 704 854 A1 | 9/2006 |
| GB | 230627 A | 6/1998 |
| JP | 58-132368 | 8/1983 |
| JP | 61-296965 | 12/1986 |
| JP | 1-143767 A | 6/1989 |
| JP | 02041777 | 2/1990 |
| JP | 3-004376 A | 1/1991 |
| JP | 8 308219 | 11/1996 |
| JP | 09-271940 | 10/1997 |
| JP | 09-271940 A | 10/1997 |
| JP | 11-235040 | 8/1999 |
| JP | 11-235040 A | 8/1999 |
| JP | 2000-173794 | 6/2000 |
| JP | 4303714 | 5/2009 |
| KR | 06075117 | 1/2007 |
| MX | 270420 | 9/2009 |
| TW | I314490 | 9/2009 |
| WO | WO 03/015973 A | 2/2003 |

OTHER PUBLICATIONS

European Search Report, EP 06 00 0268.
Japanese Office Action, Patent Application No. 2005-134928, Jun. 19, 2008.
The Notification of the First Office Action, Jun. 13, 2008.
European Search Report, EP 07 10 3523, Munnich, Jan. 30, 2008, Jeggy, Thierry.
European Search Report, EP 05 005216, Feb. 9, 1990.
Jung-Goo Cho, Ju-Won Baek, Geun-Hie Rim, and Iouri Kang, "Novel Zero-Voltage-Transition PWM Multiphase Converters", IEEE Transactions on Power Electronics, vol. 13, No. 1, Jan. 1998.
Wenkang Huang, George Schuellein, and Danny Clavette, "A Scalable Multiphase Buck Converter", International Rectifier.
George Schuellin, "Multiphase Converter Bucks Power", EE Times.
Jens Czogalla, Jieli Li, and Charles R. Sullivan, "Automotive Application of Multi-Phase Coupled-Inductor DC-DC Converter", IAS 2003.
Pit-Leong Wong, Peng Xu, Bo Yang, and Fred C. Lee, "Performance Improvements of Interleaving VRMs With Coupling Inductors", IEEE Transactions on Power Electronics, vol. 16, No. 4, Jul. 2001.
P. Zumel, O. Garcia, J.A. Cobos and J. Uceda, "Magnetic Integration for Interleaved Converters", 2003 IEEE.
Lloyd Dixon, "Coupled Filter Inductors in Multi-Output Buck Regulators", 2003, Texas Instruments Incorporated.
D.J. Shortt, W.T Michael, R.L. Avant, and R.E. Palma, "A 600 Watt Four Stage Phase-Shifted-Parallel DC-to-DC Converter", pp. 136-143.
Chun Cheung and Ross O. Staffhorst, "ISL6558EVAL1-Multi-Phase Power Conversion for Routers an PC Peripherals Up to 100A", Intersil, Nov. 2002.
Wang Li-Qiao, Li Jian-Lin, Zhang Zhong-Chao, "Carrier Phase Shifted SPWM Based on Current Sourced Multi-Modular Converter for Active Power Filter"; Journal of Zhejiang University Science.
Hacy Bodur and A. Faruk Bakan, "A New ZVT-PWM DC-DC Converter", IEEE Transactions on Power Electronics, vol. 17, No. 1, Jan. 2002.

Hacy Bodur ND A. Faruk Bakan, "A New ZVT-ZCT-PWM Dc-Dc Converter", IEEE Transactions on Power Electronics, vol. 19, No. 3, May 2004.
K. Mark Smith Jr. and K.M. Smedley, "Properties and Synthesis of Passive, Lossless Soft-Switching PWM Converters", pp. 1-8.
EP Search Report, EP 05 02 5646, Jan. 23, 2008.
EP Communication, 06 000 268.0-2302, Jan. 9, 2008.
Chinese Office Action, Publication No. 2005100840791.
1995 paper with translated abstract, "Study on Multi-Function Arc Welding Dual Inverter".
Japanese Office Action, Patent Application No. 2006-030436, Apr. 9, 2008.
Japanese Office Action, Patent Application No. 2005-314067, Apr. 9, 2008.
Mantaro Nakamura, "A Chopper Type DC/DC Converter", Application No. 7-283959, filed Oct. 31, 1995.
Japanese Office Action, Patent Application No. 2006-015765, Apr. 9, 2008.
Haruo Moriguchi, "An Arc Welding Machine", Application No. 56-212074, filed Dec. 25, 1981.
Masahiko Akamatsu, "DC Power Control Apparatus", Application No. 41-80885, filed Dec. 10, 1996.
Koichi Makinose et al., "DC/DC Converter", Application No. 2-223521, filed Aug. 24, 1990.
European Search Report, EP 06 00 0263, Munich, May 30, 2006, Jeggy T.
Canadian Office Action, Nov. 6, 2008.
Office Action of the IPO, Sep. 18, 2008.
The Notification of the First Office Action, Aug. 8, 2008.
Notice of the Final Rejection, Oct. 7, 2008, Patent Application No. 2005-314067.
Notice of Final Rejection, Oct. 7, 2008, Patent Application No. 2006-015765.
CA Application No. 2,518,125; Official Action Dated Mar. 10, 2011.
EP Application No. 11005096.0: Extended European Search Report Dated Oct. 27, 2011.
R. Streit et all: "High efficiency telecom rectifier using a novel soft-switched boost-based input current shaper", 1991, Intelect 91-IEEE, XP009070017. * p. 724, right-hand column, paragraph 3-p. 725, left hand column, paragraph 1: figures 7.8.
H. Bodur et al: "A new ZVT-ZCT-PWM DC-DC converter", IEEE Transactions on Power Electronics, vol. 19, No. 3, 2004, pp. 675-684, XP002391953.
*Sinusoidal Line Current Rectification with a 100 kHz B-Sit Step-Up Converter* by Ned Mohan, Tore M. Undeland and Ralph J. Ferraro—1984.
*The Incredible Shrinking (Unregulated) Power Supply* by Dr. Ray Ridley.
*Boost Power Factor Corrector Design with the UC3853*—Application Note U-159 by Phillip C. Todd—Unitrode Corporation—1999.
*Power Supply Cookbook* by Marty Brown—Copyright 1994 by Butterworth-Heinemann.
*Choose the Optimum Topology for High Power Factor Supplies*—by Bob Mammano and Lloyd Dixon—Unitrode IC Corporation PCIM Mar. 1991.
*High Power Factor Preregulators for Off-Line Power Supplies* by Lloyd H. Dixon, Jr. Unitrode Corporation.
*The LT1248 Power-Factor Corrector* by Cark Nelson—Linear Technology Magazine—Jun. 1993.
*High Power Factor Preregulator*—Unitrode.
*Recent Developments in High-Frequency Quasi-Resonant and Multi-Resonant Converter Technologies*—Lee et al 1989.
*Zero-Voltage Switching Technique in DC/DC Converters*—Liu and Lee 1986.
*Zero-Voltage-Switched Quasi-Resonant Buck and Flyback Converters*—Tabisz, Gradzki and Lee 1989.
*Zero-Voltage-Switching Technique in High-Frequency Off-Line Converters*—Jovanovic, Tabisz and Lee—Date N/A.
*Zero-Voltage-Switching Multi-Resonant Technique—A Novel Approach to Improve Performance of High-Frequency Quasi-Resonant Converter*—Tabisz and Lee—Date N/A.

(56) References Cited

OTHER PUBLICATIONS

*Design Considerations for High-Voltage High-Power Full-Bridge Zero-Voltage-Switched PWM Converter*—Sabate, Vlatkovic, Ridley, Lee & Cho—1990.
*Designing a High Efficiency FET Inverter Module for Vector Summations Switching High Power Amplifier*—Fang, Chen and Lee—Date N/A.
*An Improved Zero-Voltage-Switched PWM Converter Using a Saturable Inductor*—Hua, Lee and Jovanovic—1991.
*Quasi-Square-Wave Converters; Topologies and Analysis*—Vorperian—1988.
*A New Class of Zero-Voltage-Switched PWM Converters*—Hua & Lee—1991.
*High Efficiency Telecom Rectifier Using a Novel Soft-Switched Boost-Based input Current Shaper*—ITTT 1991.
*A New ZVT-PWM DC-DC Converter*—IEEE 2002.
*A New ZVT-ZCT-PWM DC-DC Converter*—IEEE 2004.
*Properties and Synthesis of Passive, Lossless Soft-Switching PWM Converter s*—International Congress of Israel in Energy Power & Motion Control—May 1997.
*Unique Cascaded Power Converter Topology for High Current Low Output Voltage Applications*—Balogh, Bridge and Andreycak.
Co-pending U.S. Appl. No. 10/889,866.
Co-pending U.S. Appl. No. 11/051,196.
Co-Pending U.S. Appl. No. 11/102,429.
Co-Pending U.S. Appl. No. 11/551,957.
Ridley, "The Incredible Shrinking (Unregulated) Power Supply".
Tabisz, Gradzki, and Lee, "Zero-Voltage-Switched Quasi-Resonant Buck and Flyback Converters—Experimental Results at 10 MHz", IEEE Transactions on Power Electronics, vol. 4.
CA Application No. 2,580,041: Examiner's Report, dated Sep. 9, 2011.
EP Application No. 07 103523.2: EP Communcation, dated May 5, 2011.
CA Application No. 2,518,125: Examiner's Report dated Jul. 11, 2012.

\* cited by examiner

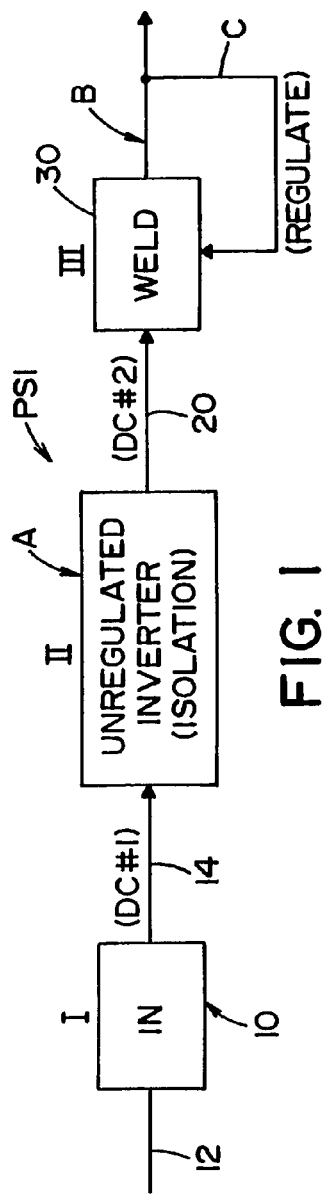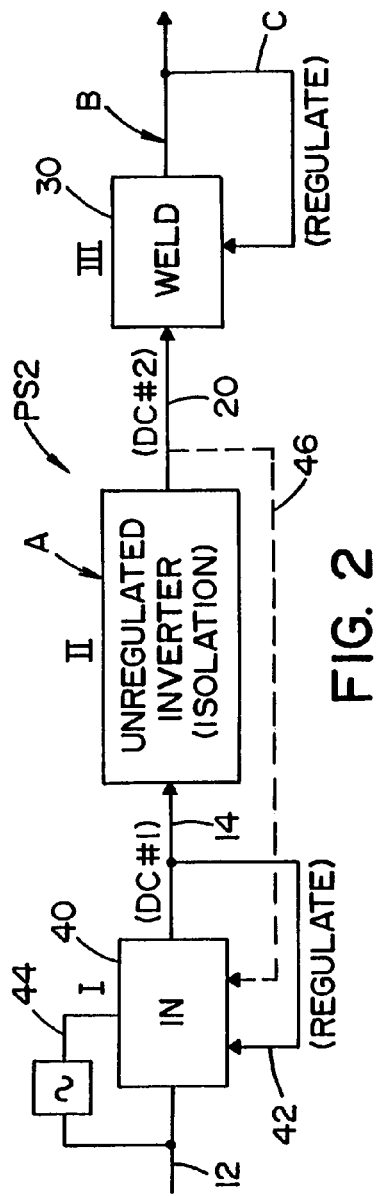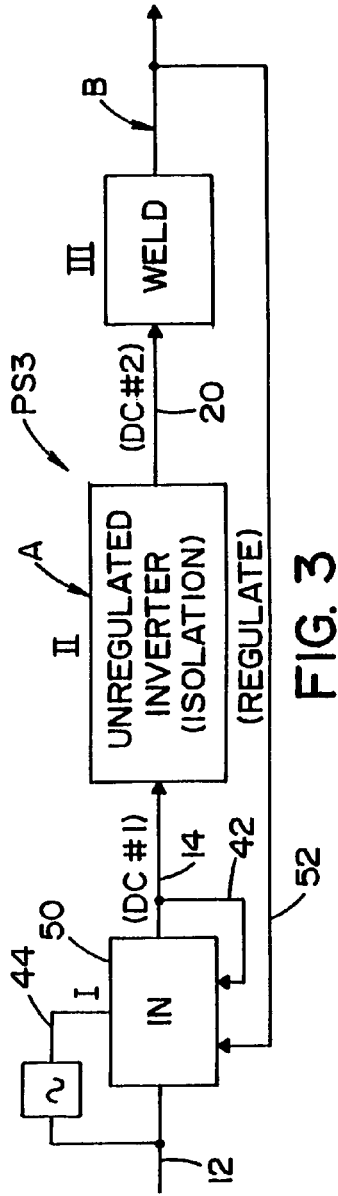

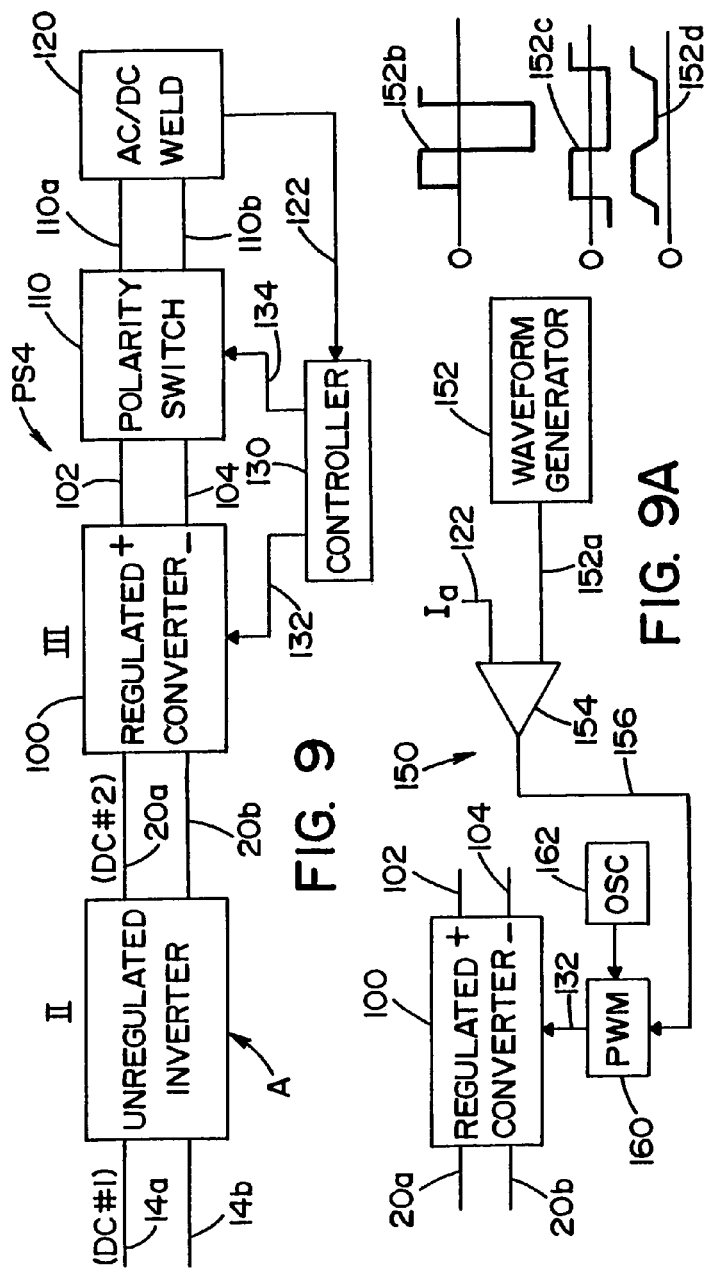
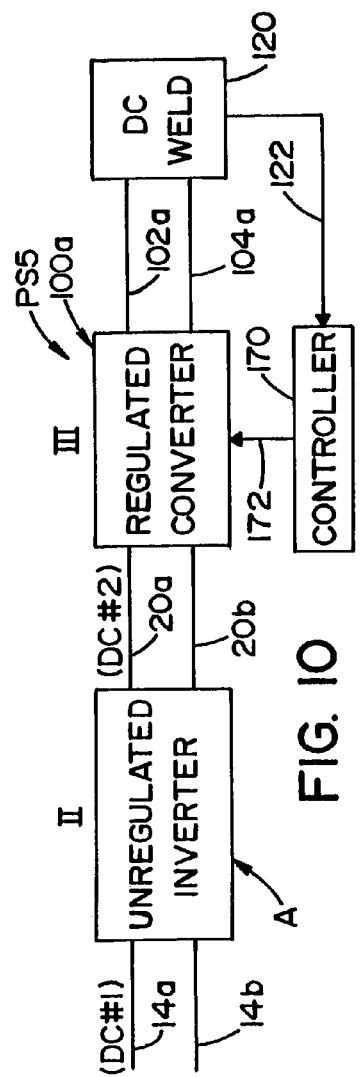
FIG. 9
FIG. 9A
FIG. 10

THREE STAGE POWER SOURCE FOR ELECTRIC ARC WELDING

The invention relates to the field of electric arc welding and more particularly to an improved three stage power source for such welding and a novel relationship between the first two stages of the three stage power source.

INCORPORATION BY REFERENCE AND BACKGROUND OF INVENTION

Electric arc welding involves the passing of an AC or DC current between a metal electrode and a workpiece where the metal electrode is normally a cored metal wire or solid metal wire. A power source is used to create a given current pattern and/or polarity between the advancing electrode wire and workpiece so that the arc will melt the end of the advancing welding wire and deposit the molten metal on the workpiece. Although various converter technologies are used for power sources, the most effective is an inverter based power source where a switching network includes switches operated at high frequency to create the desired waveform or current level for the welding process. An inverter type power source is discussed in Blankenship U.S. Pat. No. 5,278,390 where the inverter is controlled by "waveform control technology" pioneered by The Lincoln Electric Company of Cleveland, Ohio. The actual waveform is generated by a series of short pulses created at a frequency generally above 18 kHz and the group of short pulses has a profile controlled by a waveform generator. In accordance with standard power source technology, the input signal to the inverter stage of the power source is rectified current from a sine wave power supply. An appropriate power factor correcting converter is common practice and is either a part of the inverter switching network itself, as shown in Kooken U.S. Pat. No. 5,991,169, or is located before the inverter stage, as shown in Church U.S. Pat. No. 6,177,645. Indeed, a power source with a power factor correcting converter or stage has been known in the welding art for many years. Another power source employing an input power factor correcting converter in the form of a boost converter is shown in Church U.S. Pat. No. 6,504,132. The two patents by Church and the patent by Kooken are incorporated by reference herein as background information. In both Kooken U.S. Pat. No. 5,991,169 and Church U.S. Pat. No. 6,504,132 the actual welding current is regulated by an output chopper or buck converter and isolation is obtained by a transformer either in the output of the inverter stage or in the output of the input boost converter. These various topologies for power sources are common knowledge in arc welding technology. In these prior art patents, the actual welding current, voltage or power is regulated in or before the output stage of the power source, which output stage is either an inverter or a chopper. Neither the inverter, nor the chopper is unregulated to produce a fixed, lower voltage DC bus for driving a regulated welding stage.

Isolation of the welding operation is a characteristic of most power supplies for welding. The term "welding" includes "plasma cutting." In Vogel U.S. Pat. No. 5,991,180, a preregulator using a boost converter is directed to a converter which is disclosed as a chopper having an output isolation transformer located after welding regulation and directly driving the welding operation. In this power source, the chopper network is controlled to create the desired regulated output welding current and isolation is provided in the output stage. In a like manner, Thommes U.S. Pat. No. 5,601,741 discloses a boost converter for driving a pulse width modulated controlled inverter providing the regulated output signal to the actual welding operation. In both Vogel and Thommes, the second stage is regulated to direct the power factor controlled current from a preregulator into a welding operation. Welding regulation is in the second stage and is normally driven by a pulse width modulator control circuit. Both Vogel and Thommes are incorporated by reference herein as background technology. In Moriguchi U.S. Pat. No. 6,278,080 an inverter type power source is regulated to control the desired welding current. Isolation is obtained by a transformer between the controlled second stage inverter and the welding output which is disclosed as a DC welding operation. A similar power source is shown in Moriguchi U.S. Pat. No. 5,926,381 and Moriguchi U.S. Pat. No. 6,069,811 wherein the isolation of the control current from the inverter stage is at the output of the inverter and directly drives the welding operation. Moriguchi U.S. Pat. No. 5,926,381 discloses the common arrangement for using the voltage at the output of the first stage boost converter to provide the controller voltage for either the regulated inverter stage or the boost converter itself. The three Moriguchi patents are incorporated by reference herein as background information showing the prior art power source where a regulated inverter is driven by an input boost converter or a DC output of a rectifier to produce a controlled welding current directed to an output transformer used for isolation. The secondary AC signal of the isolation transformer is directly used for the welding operation. There is no third stage topology as used in the novel power source of the invention.

Turning now to non-welding technology, an aspect of the invention is the use of a synchronous rectifier device at the output of a DC/DC second stage converter. Synchronous rectifiers are common practice and one such rectifier is illustrated in Boylan U.S. Pat. No. 6,618,274. Calkin U.S. Pat. No. 3,737,755, discloses a DC/DC converter for low power use where a fixed regulated current is directed to a non-regulated inverter to provide a non variable output DC signal. Any control of the non-regulated inverter is at the input side of the inverter so that the input DC signal is the only parameter that can be regulated to control the fixed output DC signal of the inverter. This is a topography that requires a control of the signal to the inverter so that the inverter provides a controlled fixed output signal. The non-welding general background technology in Boylan and Calkin is incorporated by reference herein to show a synchronous rectifier and a version of a non-regulated inverter where any regulation is performed before the inverter by controlling the level of the input DC signal. Neither of these patents relate to a power source for welding and are only incorporated by reference as general technical concepts, such as synchronous rectifier devices and unregulated inverters. A non-welding two stage AC to DC converter is shown in Smolenski U.S. Pat. No. 5,019,952 for imparting minimum harmonic distortion to the current flowing into the converter. The load is not variable and does not require regulation as demanded in a welding operation. This patent is incorporated by reference to show general technology not related in any way to the demands of a power source for electric arc welding.

These patents constitute the background information relating to a power source that must be regulated by a welding operation where such regulation is by a feedback loop of average current, average voltage, and power of the actual welding operation. Fixed load power sources are not relevant to the invention, except as general technical information.

In the past, an inverter in a power source outputted a welding current regulated by a parameter in the welding operation, such as current, voltage or power. This inverter was normally controlled by a pulse width modulator wherein the duty cycle of the switches operated at high frequency was controlled by the feedback from the welding operation so that the duty cycle was adjusted in a range substantially less than 100%. This type of PWM controlled inverter is referred to as a regulated single stage inverter. Such inverter formed the output of the power source and was the last stage of the power source. Lower duty cycles resulted in higher primary currents and more losses. The efficiency of the inverter varied according to the duty cycle adjustment caused by the requirement of regulating the output of the single stage inverter to create an output signal suitable for welding. Using a power source where the final stage is a regulated single stage inverter resulted in heat losses, lower efficiency, high cost and increased component size. For these reasons, some welding source manufacturers have marketed power sources as being better than an inverter power source because they do not use inverters with the resulting high cost and other difficulties. An inverter stage which had the dual function of isolating the output and regulating the current for the purposes of creating a current suitable for welding was to be avoided. See Hoverson U.S. Pat. No. 6,723,957, incorporated by reference herein as background.

The Three Stage Power Source Improved by the Present Invention

The present invention is used with a three stage power source for electric arc welding (plasma cutting) wherein the inverter of the power source is a second stage as in the past, but is unregulated so that a third stage can be added to provide the actual regulation for creating a current suitable for welding. By using this novel three stage concept, the inverter can operate at a very high frequency of switching whereas the output third stage can be a chopper operated at a lower frequency of switching. Consequently, the switching frequency is optimized by the function performed by the stage as opposed to the need for using high frequency in a pulse width modulated inverter stage used for actual regulation of the output welding current. Furthermore, the isolated, fixed DC voltage to the regulated third stage can be substantially lower than the DC voltage from the input converter stage and much higher than the actual welding output voltage.

The three stage power source using the invention involves a novel topography for a power source wherein the pulse width modulated inverter is merely a second stage for creating an isolated fixed output DC bus without a feedback signal to the second stage pulse width modulated inverter. This isolated bus is used in a third stage regulated by the actual welding parameters to create a current suitable for welding. Consequently, the invention involves an unregulated second stage not only providing necessary isolation but also to producing a fixed DC output bus to be used by a third stage wherein welding regulation is accomplished. The unregulated second stage inverter is operated at a very high frequency with a duty cycle that is fixed during operation of the power source. The frequency is over 18 kHz and preferably about 100 kHz. The duty cycle is fixed at various levels; however, the preferred duty cycle is close to 100% to give the maximum efficiency level. The use of a fixed, high duty cycle minimizes the current circulation time of the phase shift modulator controlled inverter second stage to substantially reduce heat and increase efficiency. The output of the second unregulated inverter stage can be a rectifier using well known synchronous rectifier devices, which devices are controlled by the secondary winding of the internal isolation transformer of the second stage unregulated inverter. By using synchronous rectifier devices at the output of the second stage, there is further improvement in the total efficiency of the power source. The first stage is either an input rectifier or an input rectifier with a power factor correcting converter. A first stage power factor correcting converter is preferred. This converter is after a standard rectifier or can be combined with the rectifier. Of course, this converter can be a passive power factor correcting converter or an active converter such as a boost, buck or buck+boost converter. The first stage of the invention produces a first DC bus with a fixed voltage. By using a standard first stage for the power source, the first DC output signal which is the input DC bus to the unregulated inverter can be regulated and fixed at a value of about 400-900 volts DC. The output of the unregulated, isolation inverter forming the second stage of the novel power source is a fixed DC bus having a fixed relationship with the input DC bus from the first stage. The voltage of the second DC bus or output is substantially less than the voltage of the DC bus from the first stage. The power source thus produces a second DC bus which has a fixed mathematical relationship with the input DC bus from the power factor correcting converter. In accordance with standard practice, the second stage unregulated inverter includes an isolation transformer having a primary winding and a secondary winding so that the secondary winding is isolated from the input of the power source. See Steiger U.S. Pat. No. 4,864,479, incorporated by reference herein. The unregulated, second stage inverter can be operated at a switching frequency to optimize the operation of the second stage inverter. Thus, extremely high switching frequency is used to reduce the size and cost of the components in the novel, unregulated second stage inverter. By utilizing a fixed duty cycle with phase shift control, voltage and current surges in the switching devices are reduced to provide a soft switching operation. Indeed, in the preferred embodiment, the duty cycle is fixed at close to 100% so that the switches are full on or full off. This drastically reduces the circulated current in the second stage and greatly improves the operating characteristics of the second stage inverter which also provides the function of isolating the welding output of the power source from the AC input of the power source. By having the switching devices in the second stage unregulated inverter operated at full on, this inverter has a high efficiency and is very flexible in operation. An isolation transformer determines the relationship between the fixed DC bus at the input side of the unregulated second stage (a "first DC output signal" from the first stage) and the DC output bus at the output of this second stage (a "second DC output signal"). In some prior art power sources, the duty cycle at the primary winding of the isolation transformer in the regulated inverter is regulated by the welding operation. There is no regulation by the welding operation in either the first stage or second stage of the novel three stage power source to which the present invention is directed.

A power source for electric arc welding having an active power factor correcting feature and tight output control of the energy directed to the welding operation requires at least two switching stages. These two stages assure that instantaneous energy transferred into the power source and transferred out the power source can be regulated independently with appropriate energy storage components. Thus, a power factor correcting power source for electric arc welding generally requires two independent switching control circuits. One of the control circuits is used to control the energy or the output current for the welding operation. The other control circuit is used to control the DC signal from the active power factor correcting converter forming the first stage of the power source. Thus, electric arc welding power sources having power factor correcting capabilities requires two switching networks each of which has independent control requirements. The first switching control is for the output welding current and the other switching control is for power factor correcting at the input stage of the power source. This second switching control assures that the output of the first stage is a fixed DC voltage referred to as a "DC bus." The voltage of the DC bus itself is used to control the first stage converter to assure that the DC bus from this converter has a fixed voltage level. To recapitulate an inverter based power source for electric arc welding requires two separate switching networks and two control circuits for these networks.

An inverter based power source for electric arc welding has another conceptual requirement. One of the stages in the power source must provide electrical isolation between the variable input AC signal and the regulated output current suitable for welding. The isolation device is normally in the form of a transformer. In prior art, two stage inverter based power sources there are two locations for the isolation device. In the first example, the power factor correcting input stage is not isolated and an isolation transformer is provided in the second stage regulated output inverter. In another example, isolation is in the first stage power factor correcting converter. In this second example, a non-isolation output inverter or other non-isolation converter can be used as the second stage. The first example is more efficient than the second example due to 60 Hz effect on the RMS current at the input side of the power source. In recapitulation, the second conceptual requirement of a welding power source is isolation.

The two requirements of an active power factor correcting power source for welding are (a) two separate and independent control circuits for two separate switching networks and (b) an appropriate structure for isolating the input of the power source from the output of the power source. These basic requirements of inverter based power sources are implemented in the background three stage power source. The unregulated second stage is an isolation stage between two regulated non-isolation stages to form a unique arrangement involving a three stage inverter based power source. The novel three stage power source is more efficient than the two stage inverter based power source assuming the same power factor correcting preregulator is used. Thus, the novel three stage power source is more efficient, but still has the essential characteristics required for a power source used in electric arc welding. There are two independently controlled switching networks. There is an isolation stage. These constraints are accomplished in a manner to increase efficiency and obtain better welding performance and better heat distribution of the power switching components.

Since the second unregulated inverter stage of the three stage power source provides system isolation, many types of non-isolated converters can be used as the power factor correcting preregulator. A boost converter is the most popular converter due to the current shaping function and the continuous line current characteristics of this type of conversion. However, the output voltage of the boost converter is higher than the peak of the highest line voltage, which peak can be as high as 775 volts. Thus, other active power factor correcting regulators can be used with the invention, which is a three stage power source wherein the second stage is unregulated and provides isolation. One of the other options for the active power factor correcting input or first stage is a step-up/step-down converter so that the primary voltage bus or input bus to the second stage can be lower than the peak of the input AC voltage signal to the power source. This type of power factor correcting converter still produces low harmonics. One such power factor converter is referred to as a buck+boost converter. A 400 volt to 500 volt DC bus used for the second stage is obtained with an input AC voltage in the range of 115 volts to 575 volts. Irrespective of the AC voltage to the first stage, the output voltage of the active power factor converter is controlled to be at a level between 400 volts and 500 volts. Other types of active and passive power factor correcting inverters can be used in the invention. The preferred converter is active thus constituting a second switching network requiring a second control circuit. When using the term electric arc welding, it also includes other output processes, such as plasma cutting.

As so far explained, the three stage power source using the invention involves a three stage power source for electric arc welding. A feedback control in the third stage creates an output current suitable for welding. The input first stage is normally an active power factor correcting converter requiring a second switching network and a second independent control circuit. This three stage topography is not used in the prior art. By having this topography, the added second stage is merely used to convert the high voltage DC bus at the primary side of the second stage to a lower voltage DC bus at the secondary side of the second stage isolated from the primary side. Thus, the three stage involves a DC bus at the secondary side of the second stage so that the bus can be used for regulation of welding power. The term "bus" means a DC signal that has a controlled fixed level. The three stage power source has a first DC bus from the input stage called the "first DC output" which first DC output has a controlled DC voltage. There is a second DC bus at the secondary side of the second stage called the "second DC output" which second DC output is also a controlled DC voltage level. The creation of a second DC bus at the secondary side of an unregulated inverter has advantages, other than the advantages associated with the use of the unregulated second stage inverter as so far described. The secondary DC bus or second DC output is isolated from the primary side of the second stage so that there is no isolation required in the third stage welding control circuit. In other words, the output control circuit, such as a chopper, has an input DC bus with a fixed voltage level. In practice, the chopper has a controller with a control voltage that is derived from the input DC to the chopper. This input DC signal is isolated from the input power. Consequently, the control voltage for the controller of the output stage or chopper can be derived from a non-isolated DC source. This is normally the input signal to the chopper. Separate isolation of the control voltage for the controller used in the output stage is not required. The use of a fixed DC bus from the second stage allows the DC voltage to the output third stage, which is regulated by the welding operation, to be much lower than the normal input primary DC bus ("first DC output") of the power source. In the past, the output of the power factor converter is a relatively high level DC signal based upon the use of a boost converter. This high DC voltage was directed to the regulated inverter stage for use in outputting a current suitable for the welding. By using the present invention the high voltage from the output bus of the power factor converter is drastically reduced. It is more efficient to convert a 100 volt DC bus into a 15 volt control power than to convert a 400 volt DC bus to a 15 volt control power.

A second stage of the background three stage power source is in the form of an unregulated DC to DC converter has an input connected to the first DC output signal and an output in the form of a second DC output signal electrically isolated from the first DC output signal with a magnitude of a given ratio to the first DC output signal. The power source includes a third stage to convert the second DC output signal to a welding current for the welding process. The third stage of the power source includes a regulated converter such as a chopper or inverter. When using an inverter, the output is a DC signal directed to a polarity network or switch, which switch allows DC welding by the power source. The polarity switch allows welding either DC negative, DC positive or AC. The welding process, using either a chopper or an inverter, can be performed with shielding gas, such as MIG welding, and can use any type of electrode, such as tungsten, cored wire or solid metal wire. In accordance with an aspect of the invention, the output of the unregulated DC to DC converter is substantially less than the input to the second stage. In most instances, the input and output of the second stage are DC voltages with generally fixed magnitudes.

THE INVENTION

There are several benefits to operating welding inverters with high switching speeds. For instance, smaller magnetics translate into improved portability. Another advantage is the potential to have a higher band width control system, which system will result in a better arc performance. Thus, the novel three stage power source described above is improved by the present invention. This background three stage power source has power switches operated at extremely high switching speed, exceeding 18 kHz. The boost power switch for the first stage and the four power switches for the unregulated second stage are all operated at high frequency to obtain the benefit of high switching speed. There is a downside to the use of such higher switching speeds. Such switching speeds cause switching losses. If the switching losses are not reduced the power source efficiency and reliability are decreased. The switching losses are caused by the overlap of current and voltage during switching, either from the on condition to the off condition or from the off condition to the on condition. To reduce the switching losses, either the voltage or the current must be held near zero during the switching. Switching transition can be either zero voltage or zero current or both. This is called "soft switching." What are termed resonant or quasi resonant techniques have heretofore been used to obtain soft switching by zero voltage or zero current at high switching speeds. However, this type of prior soft switching control often causes higher current and voltage stresses because of the sinusoidal waveforms and still has conduction losses. However, there are prior soft switching circuits that employ zero voltage transition converters or zero current transition converters in a manner to reduce both the switching losses and the conduction losses.

It is known that the unregulated second stage inverter of the novel three stage power source to which the present invention is directed uses a phase shift PWM to control the output power. By fixing the phase shift at a high level near 100%, preferably above 80%, the switching losses in the second unregulated stage are limited. By using a fixed phase shift PWM control the second stage is operated near full conduction to produce low conduction losses. The second unregulated stage is soft switched inherently. In accordance with the invention, the three stage power source described above has soft switching in the input stage. To this end, the present invention involves the use of an active soft switching circuit for the first input stage to be combined with the inherent soft switching of the second unregulated stage. This combination of added soft switching with inherent soft switching has substantially increased the efficiency of the novel three stage power source to which the invention is directed.

The active soft switching circuit of the first stage is the type circuit described in a 1991 article by the IEEE entitled *High Efficiency Telecom Rectifier using A Novel Soft-Switching Boost-based Input Current Shaper*. This November 1991 article is incorporated by reference herein. This type circuit is also described in a 2002 article entitled *A New ZVT-PWM DC-DC Converter* by the IEEE. This article from the IEEE Transaction on Power Electronics is dated January 2002 and is incorporated by reference herein. Another active circuit for soft switching is a voltage transition-current transition circuit described in a 2004 article entitled *A New ZVT-ZCT-PWM DC-DC Converter* published by IEEE Transactions on Power Electronics published in May, 2004. This article is also incorporated by reference herein. These articles describe an active soft switching circuit or circuits of the type used in the first stage of a three stage power source. The invention combines an active soft switching for the first input stage and an inherently soft switched unregulated inverter using a phase shift PWM control. Steigerweld U.S. Pat. No. 4,864,479 is incorporated by reference herein to show a common unregulated inverter using phase shift control. This type of unregulated power stage has a topography that increases the efficiency by minimizing the circulating currents through the use of a fixed high duty cycle switching operation. The unregulated inverter operated at a fixed duty cycle will achieve soft switching on all the primary switches with a minimum amount of conduction losses. This concept is used in the second stage of the three stage power source to which the invention is directed.

In accordance with the invention, the high switching speed power switch of the first stage of a three stage power source is soft switched with an active circuit to reduce both the losses of the switch and the losses of the output rectifier. Furthermore, the soft switches input stage is combined with a second stage having an inherent soft switching capability using a fixed duty cycle, phase shift unregulated inverter. The combination of an active soft switching circuit for the first stage combined with the inherent soft switching of a fixed duty cycle unregulated inverter substantially increases the efficiency of a three stage power source of the novel type to which the present invention is directed.

By using an active soft switching circuit on the first input stage of the three stage power source, the pulse width modulator converter of the first stage has zero voltage switching for the active converter switch and zero reverse recovery current for the output diode. This soft switching is without increasing voltage or current stresses, i.e. conduction losses of the two components. This soft switching circuit for the power switch (active) for the first stage includes a zero voltage transition using a network with an inductance branch and capacitor branch both in parallel with both the active pulse width modulating power boost switch and the passive output switch or output boost diode. The two branch network includes an induction branch capacitance branch controlled by switching of an auxiliary switch. The auxiliary switch is also connected in parallel with the pulse width modulated power boost switch and is turned on for a short interval just prior to the turn on of the pulse width modulated switch. The network inductor current ramps up until it turns off the output rectified diode, communicating it with a soft switching operation. The inductor current continues to increase bringing the voltage across the pulse width modulated circuit to zero at a time prior to the turn on of the boost switch. An anti-parallel diode of the pulse width modulator switch is thus forward biased. The turn on signal for the power switch is applied while the anti-parallel diode is conducting to provide a zero voltage switching of the modulating switch at turn on. The auxiliary switch is then turned off and the modulating power switch is turned on. The auxiliary diode and capacitor provides a snubber to the voltage across the auxiliary switch so that the auxiliary switch is not stressed at turn off. The inductor branch current rapidly drops to zero, at which time the auxiliary switch turns off. The remainder of the operation is the same as that of a conventional pulse width modulated boost converter, except the energy stored in the two branch network is transferred to the load when the main switch is turned off. In some descriptions of these two branches, they are referred to as a resonant circuit which may be technically true, but not necessary to the soft switching function.

The auxiliary switch controlled two branch circuit is used in the first stage of the present invention to provide soft switching of both the power switch and the output diode. Such a circuit is described in Hua U.S. Pat. No. 5,418,704, incorporated by reference herein. Soft switching of the first stage and the natural soft switching of the second stage is the result of using the present invention.

In accordance with the present invention there is provided a three phase power source for an electric arc welding process. This power source comprises an input stage having an AC input and a first DC output signal, a second stage in the form of an unregulated DC to DC converter having an input connected to the first DC output signal, a network of switches switched at a high frequency with a given duty cycle to convert the input signal into a first internal AC signal, and isolation transformer with a primary winding driven by the first internal high frequency AC signal and a secondary winding for creating a second internal high frequency AC signal and a rectifier to convert the second internal AC signal into a DC output signal of the second stage. The magnitude of the output signal for the second stage is related to the fixed amount of overlap between the phase shifted switches, which use phase shift controlled by a pulse width modulator so that the second stage is inherently soft switched. A third stage in the power source is used to convert the second DC output signal from the second stage to a welding output for the welding process. This three stage power source is improved by providing a DC to DC converter in the first stage, where the converter has a power switch with a soft switching circuit. Thus, a soft switching circuit to the first stage compliments the inherent soft switching of the phase shift, unregulated second stage to increase the efficiency of the first two stages in the three stage power source.

In accordance with another aspect of the present invention, the soft switching circuit of the first input stage of the three stage power source is an active snubber circuit with an auxiliary switch operated in unison with the power switch to positively drive the voltage toward zero during both switching transitions. The DC to DC converter of the first stage has an output or boost diode which is also soft switched by the first stage soft switching circuit. In accordance with another aspect of the invention, the DC to DC converter of the first stage has a positive and a negative output lead with a capacitor joining the leads and a diode clamping the positive end of the auxiliary switch to the positive output lead. The three stage power source with the unique combination of an active soft switching on the first stage and an inherent soft switching on the second stage is used with a third stage chopper. In an option, the output chopper has a soft switching circuit for its power switch. All of these features of the present invention improve a three stage power source having as is novel feature a center unregulated, isolation stage to increase the efficiency of the power source while maintaining the advantage of its three stage topography.

The present invention is the combination of an input stage and an unregulated center stage of a three stage power source, wherein the first stage has an active soft switching circuit for the boost power switch and an inherent soft switching for the phase shifted unregulated second stage. Consequently, the invention involves a two stage AC to DC converter comprising an input stage having an AC input and a first DC output signal and a second stage. The second stage is in the form of an unregulated DC to DC converter having an input connected to the first DC output signal, a network of switches switched at a high frequency with a given duty cycle to convert the input into a first internal AC signal, an isolation transformer with a primary winding driven by the first internal high frequency AC signal and a second winding for creating a second internal AC signal and a rectifier to convert the second internal AC signal into a second DC output signal of the second stage. The magnitude of the output signal for the second stage is related to the amount of overlap between the phase shifted switches. The input stage includes a power switch having a soft switching network which network is an active snubber circuit with an auxiliary switch operated in unison with the power switch of the first stage.

The primary object of the present invention is the provision of a novel three stage power source wherein the first stage has an active soft switching circuit for the fast switching power switch and the second stage is an unregulated inverter forming a part of an isolation stage, which inverter has a soft switching characteristic based upon a fixed high duty cycle for its several switches.

Another object of the present invention is the provision of a two stage inverter for use in power conversion, which converter includes a power switch with an active soft switching circuit and the second stage involves an unregulated inverter with a fixed duty cycle controlled by phase shift.

Yet another object of the present invention is the provision of a three stage power source, as defined above, which three stage power source also includes an output stage in the form of a chopper with the power switch of the chopper having a passive soft switching circuit.

Yet a further object of the present invention is the provision of a three stage power source, as defined above, which power source includes an active soft switching circuit for the first stage, an inherent soft switching characteristic for the second stage, and a passive soft switching circuit for the third stage.

These and other objects and advantages will become apparent from the following description taken together with the accompanying drawings.

BRIEF DESCRIPTION OF DRAWINGS

Three Stage Power Source

FIG. 1 is a block diagram illustrating a three stage power source and disclosing an embodiment of the three stage power source improved by the invention;

FIG. 2 and FIG. 3 are block diagrams similar to FIG. 1 disclosing further embodiments of the three stage power source;

FIG. 9 is a block diagram showing the last two stages of the three stage power source wherein the output stage provides AC welding current;

FIG. 9A is a block diagram of a waveform technology control circuit for use in the three stage power source illustrated in FIG. 9, together with graphs showing three welding waveforms;

FIG. 10 is a block diagram illustrating a second and third stage of the three stage power source wherein the output stage is DC welding current;

The Invention

Figure 22:
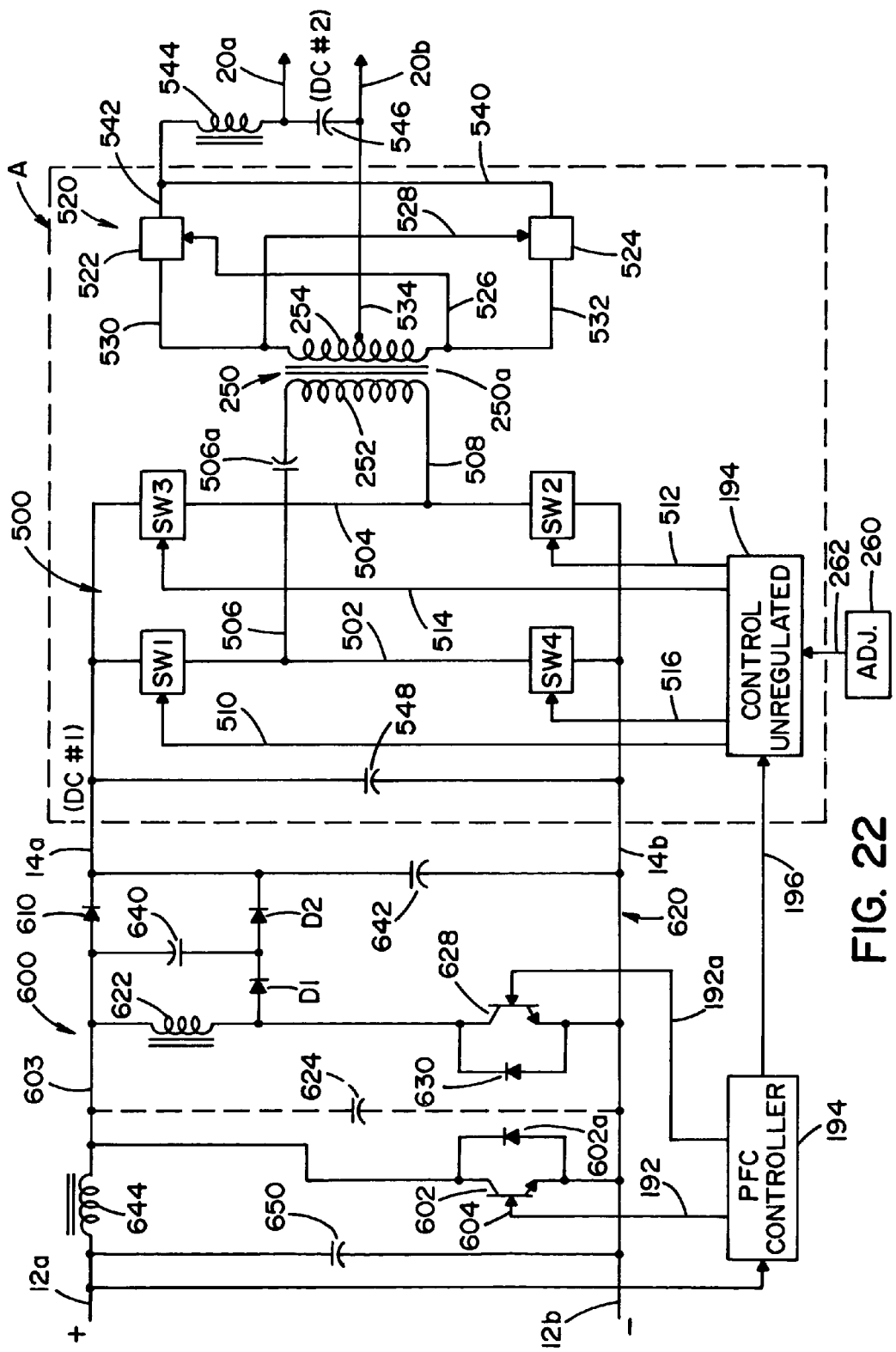
Figure 23:
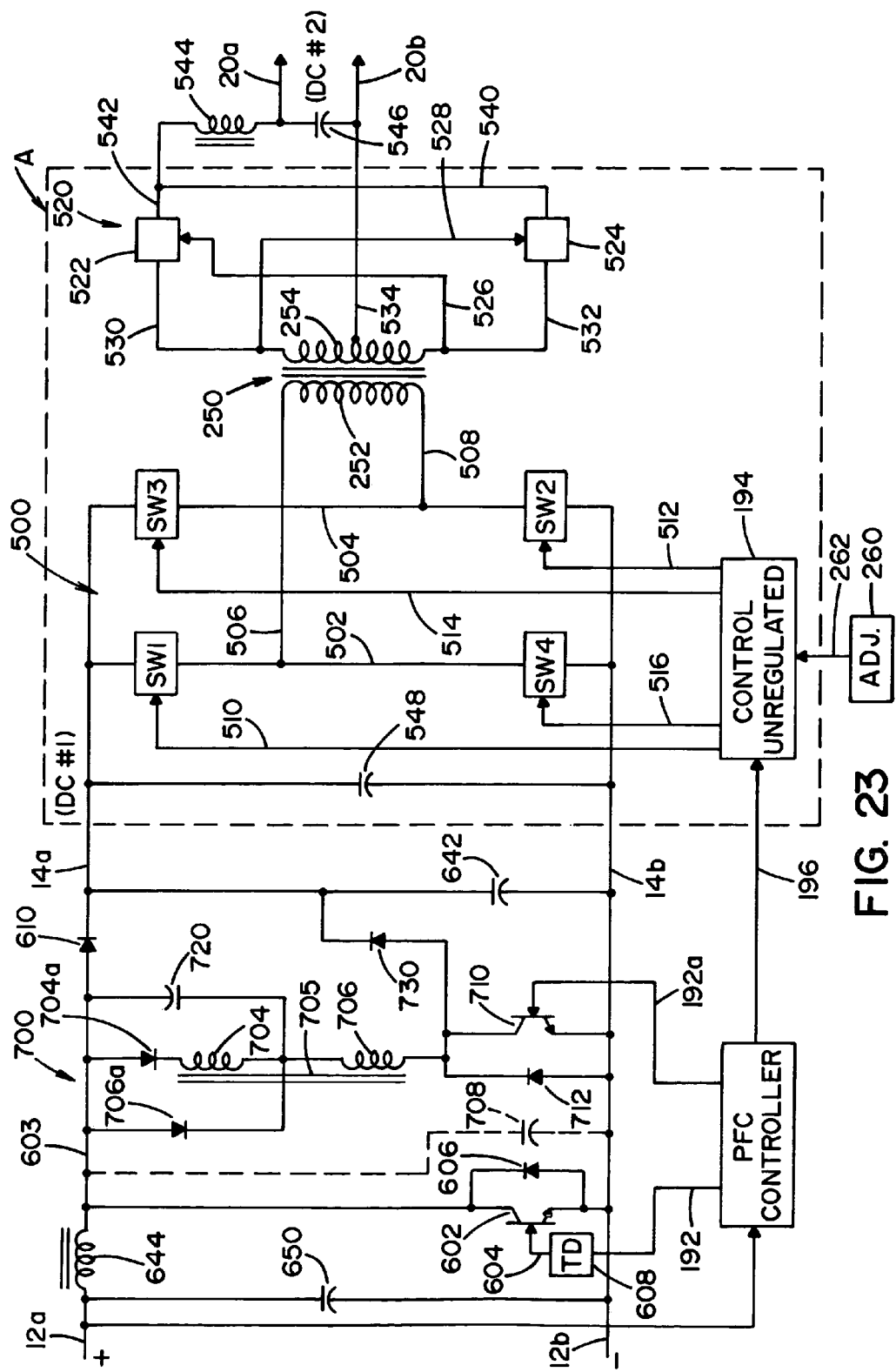
Figure 24:
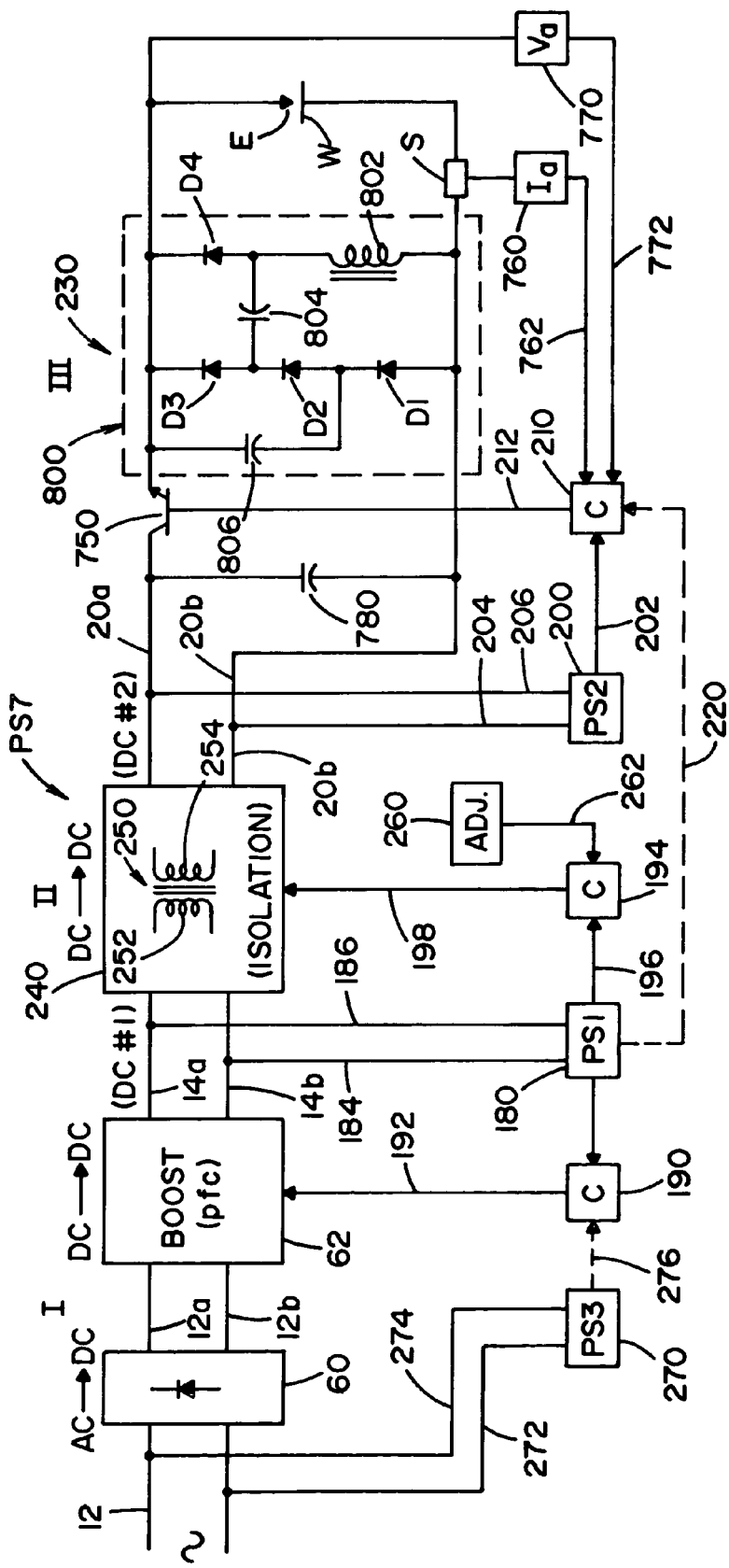
Figure 25:
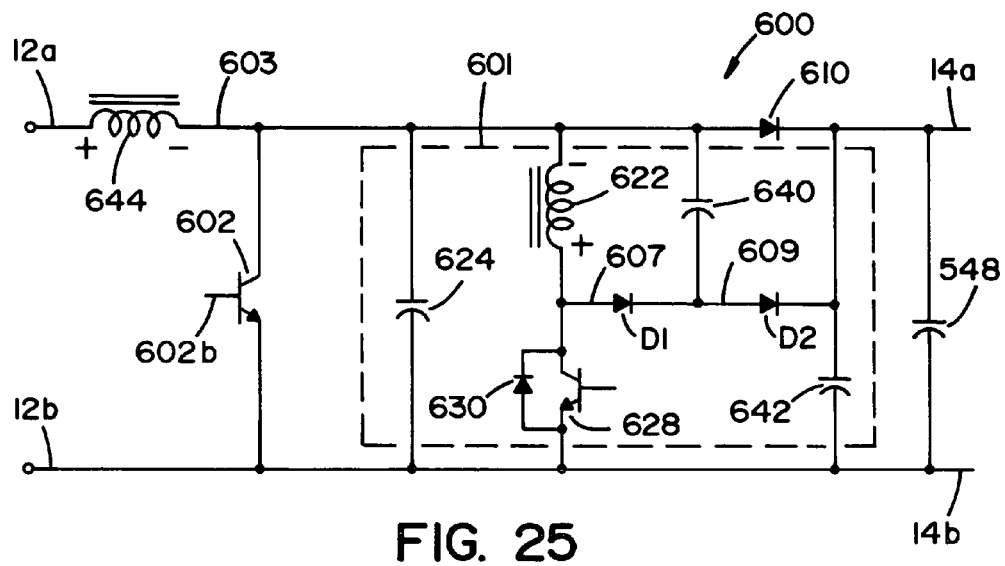
Figure 26:
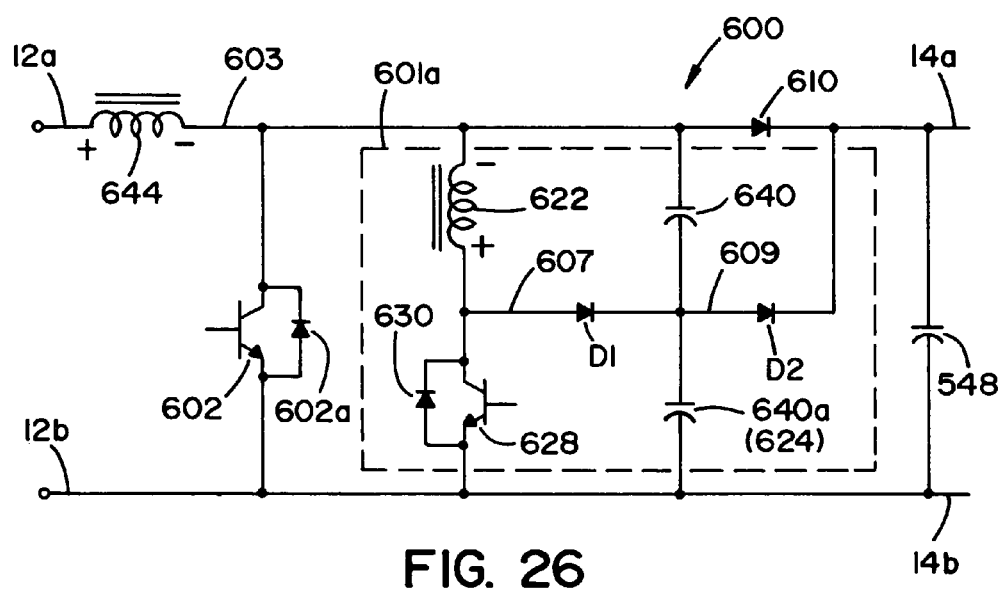
Figure 27:
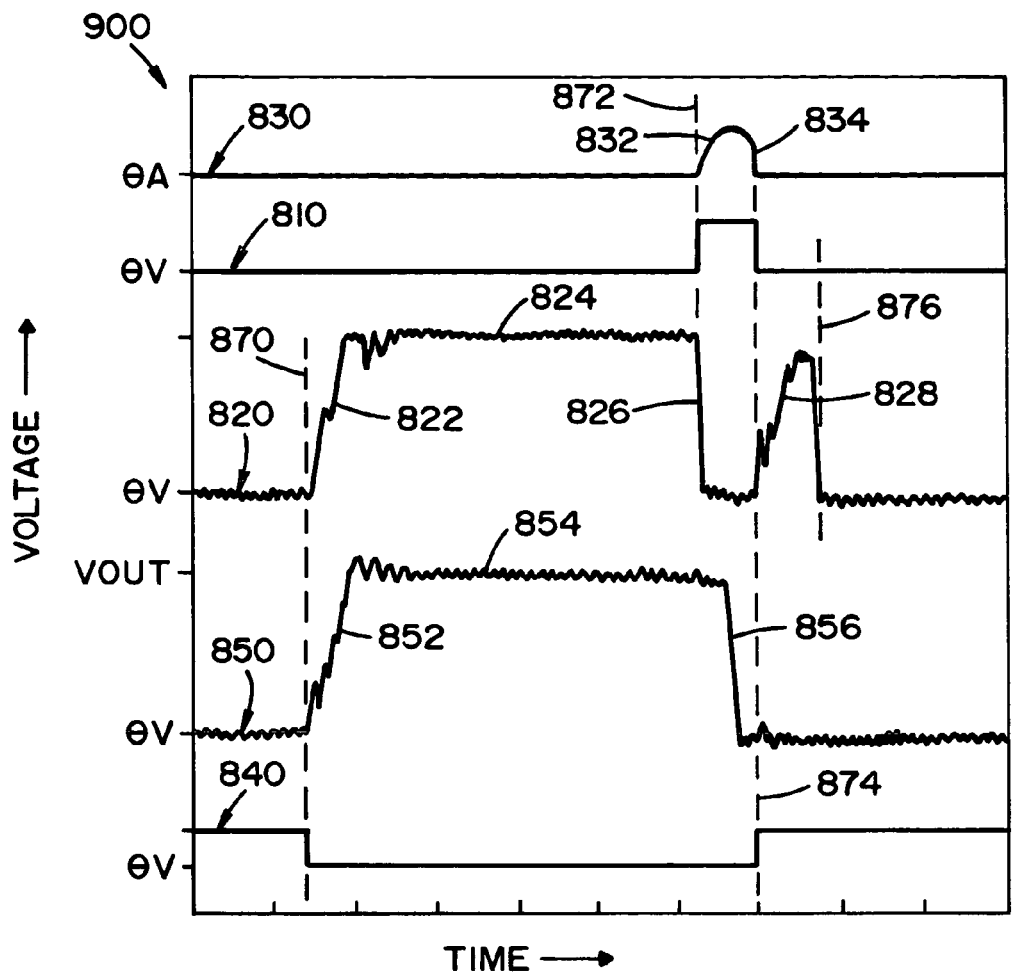

FIG. 22 is a wiring diagram of the first input stage and second isolation stage forming an embodiment of the present invention;

FIG. 23 is a wiring diagram of a second embodiment of the present invention;

FIG. 24 is a wiring diagram illustrating a three stage power source wherein the output stage is a chopper with a passive soft switching circuit;

FIG. 25 is a wiring diagram showing the active soft switching circuit used in the embodiment of the invention shown in FIG. 22;

FIG. 26 is a wiring diagram showing the active soft switching circuit used in the preferred embodiment of the invention; and, FIG. 27 is a graph of the voltage curves and trigger signals for the main power switch and the auxiliary switch of the circuit illustrated in FIG. 26.

THREE STAGE POWER SOURCE

FIGS. 1-21

The present invention is a modification of a novel three stage power source for use in electric arc welding as developed by The Lincoln Electric Company, which power source is not prior art to the present invention. The new three stage power source has an input stage for converting an AC signal into a first DC output bus. This output bus has a fixed voltage level and is directed to the input of a second stage best shown in FIG. 16. This novel second stage of the three stage power source is an unregulated inverter which includes an isolation feature and has a second DC output or second DC bus which is proportional to the DC input bus. The level relationship is fixed by the construction of the unregulated inverter. The unregulated second stage inverter has a switching network wherein the switches are operated at a high switching frequency greater than 18 kHz and preferably about 100 kHz. The switching frequency of the switch network in the unregulated inverter forming the second stage of the power source allows use of small magnetic components. The isolated DC output of the unregulated inverter is directed to a third stage of the power source. This third stage can be either a chopper or inverter which is regulated by a welding parameter, such as current, voltage or power of the welding operation. In the modification this third stage is preferably a chopper. The topography of the three stage power source has an input stage to produce a first DC signal, a second unregulated DC to DC stage to provide an isolated fixed DC voltage or DC bus that is used by the third stage of the power source for regulating the current used in the welding operation. Three examples of a three stage power source to which the present invention is directed are illustrated in FIGS. 1-3. Power source PS1 in FIG. 1 includes first stage I, second stage II, and third stage III. In this embodiment, stage I includes an AC to DC converter 10 for converting AC input signal 12 into a first DC bus 14. The input 12 is an one phase or three phase AC line supply with voltage that can vary between 200-700 volts. Converter 10 is illustrated as an unregulated device which can be in the form of a rectifier and filter network to produce DC bus 14 identified as (DC#1). Since the AC input signal is a line voltage, DC bus 14 is generally uniform in magnitude. Unregulated inverter A is a DC to DC converter with an isolation transformer to convert the DC bus 14 (DC#1) into a second DC bus or second DC output 20 (DC#2). Output 20 forms the power input to stage III which is converter 30. The DC voltage on line 20 into a current suitable for welding at line B. A feedback control or regulation loop C senses a parameter in the welding operation and regulates the current, voltage or power on line B by regulation of converter 30. In practice, converter 30 is a chopper, although use of an inverter is an alternative. By having a three stage power source PS1 as shown in FIG. 1, the switching network of the second stage has a frequency that is normally higher than the switching frequency of converter 30. Furthermore, the DC voltage in line 20 (DC#2) is substantially less than the DC voltage from stage I on line 14 (DC#1). In practice, there is an isolation transformer in inverter A. The transformer has an input or primary section or side with substantially more turns than the secondary section or side used to create the voltage on line 20. This turn ratio in practice is 4:1 so that the voltage on line 20 is ¼ the voltage on line 14. For DC #1, this voltage is around 400 volts in practice.

The general topography of three stage power source to which the present invention is directed is illustrated in FIG. 1; however, FIG. 2 illustrates the preferred implementation wherein power source PS2 has essentially the same stage II and stage III as power source PS1; however, input stage I is an AC to DC converter 40 including a rectifier followed by a regulated DC to DC converter. The converted signal is a DC signal in line 14 shown as a first DC bus (DC#1). The voltage on line 14 is regulated as indicated by feedback line 42 in accordance with standard technology. Thus, in power source PS2 the output welding converter 30 is regulated by feedback loop C. The voltage on line 14 is regulated by feedback loop shown as line 42. Since converter 40 is a power factor correcting converter it senses the voltage waveform as represented by line 44. By using power source PS2, the first DC bus 14 is a fixed DC voltage with different one phase or three phase voltages at input 12. Thus, output 20 is merely a conversion of the DC voltage on line 14. DC#2 is a fixed voltage with a level determined by the isolation transformer and the fixed duty cycle of the switching network in unregulated inverter A. This is the preferred implementation of the novel power source employing three separate and distinct stages with stage II being an unregulated inverter for converting a fixed first DC output or DC bus to a second fixed DC output or DC bus used to drive a regulated welding converter, such as a chopper or inverter. As another alternative, stage I could be regulated by a feedback from the DC #2 bus in line 20. This is represented by the dashed line 46 in FIG. 2.

Power source PS3 in FIG. 3 is another implementation of the three stage power source. This is not the preferred implementation; however, the three stage power source of the present invention can have the input converter 50 regulated by feedback loop 52 from the welding current output B. With this use of a three stage power source, converter 50 is regulated by the welding output and not by the voltage on line 14 as in power source PS2. With regulation from welding output B, converter 50 is both a power factor correcting stage and a welding regulator. However, this implementation of the three stage power source is disclosed for a complete technical disclosure.

Figure 4:
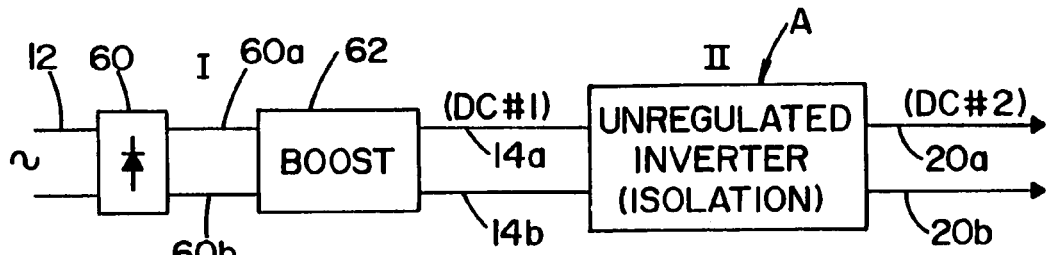
FIGS. 4-8 are partial block diagrams illustrating the three stage power source with different first stage embodiments.
Figure 5:
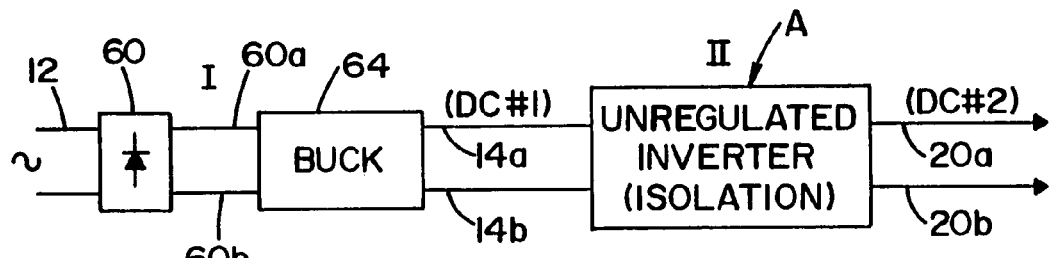
Figure 6:
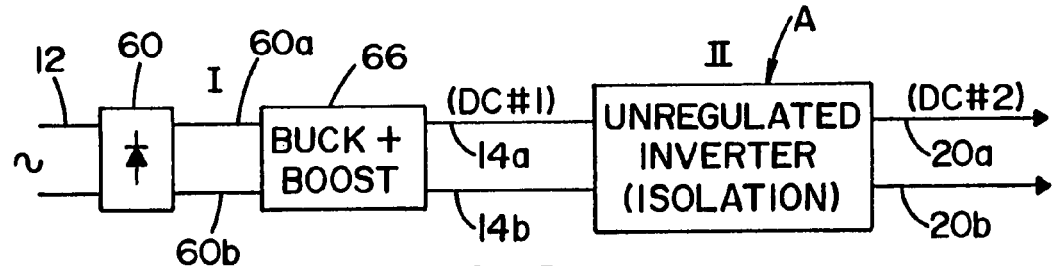
Figure 7:
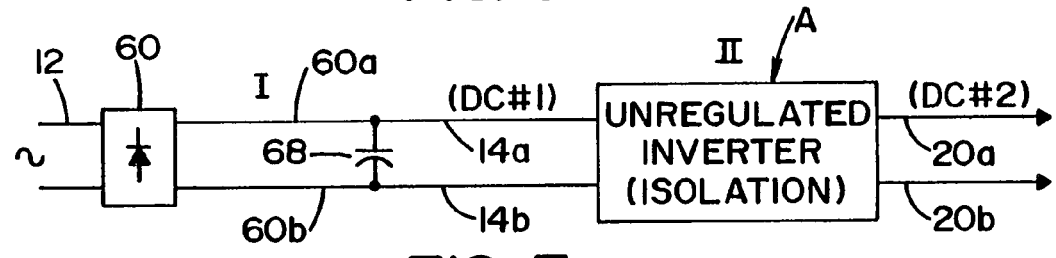
Figure 8:
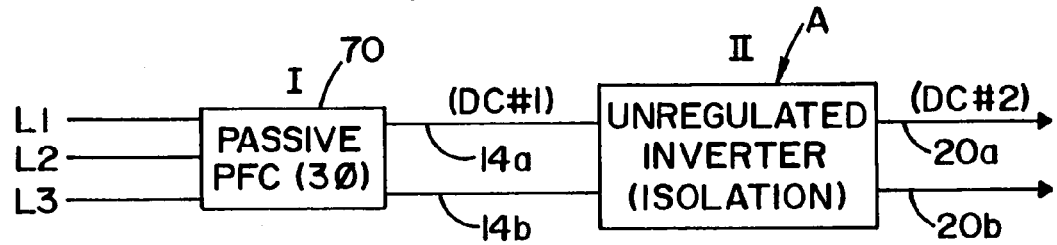

As previously described, input stage I converts either a single phase or a three phase AC signal 12 into a fixed DC bus 14 (DC#1) for use by the unregulated inverter A constituting second stage II. The novel three stage power source generally employs a DC to DC converter in stage I to produce the DC voltage indicated as line 14 in FIGS. 1-3. The DC to DC converter of stage I can be selected to create the desired voltage on line 12. Three of these converters are shown in FIGS. 4-6 wherein an input rectifier 60 provides a DC voltage in lines 60a, 60b to a DC to DC converter which may be a boost converter 62, a buck converter 64 or a buck+boost converter 66, as shown in FIG. 4, FIG. 5 and FIG. 6, respectively. By using these converters, the DC to DC converter of stage I incorporates a power factor correcting chip, which chip allows the power factor to be corrected thereby reducing the harmonic distortion at the input of the power source. The use of a power factor correcting input DC to DC converter is well known in the welding art and is used in many prior art two stage topographies. Converters 62, 64 and 66 preferably include a power factor correcting chip; however, this is not required. The main purpose of stage I is to provide a DC bus (DC#1) in line 12, which bus is indicated to be lines 14a, 14b in FIGS. 4-6 to produce a fixed DC bus (DC#2) in line 12 indicated by lines 20a, 20b in the same figures. Power factor correction is not required to take advantage of the novel three stage topography. A non power factor correcting input stage is illustrated in FIG. 7 where the output lines 60a, 60b of rectifier 60 are coupled by a large storage capacitor 68 to produce a generally fixed voltage in lines 14a, 14b. Stage I in FIG. 7 does not incorporate a power factor correcting circuit or chip. However, the power source still involves three stages wherein the second stage is unregulated isolated inverter A to produce a generally fixed voltage on lines 20a, 20b. Another modification of input stage I is illustrated in FIG. 8 where a passive power factor correcting circuit 70 is connected to a three phase AC input L1, L2 and L3 to produce a generally fixed DC voltage across lines 14a, 14b, which lines constitutes the DC bus 14 (DC#1) at the input of inverter A. The disclosures of modified stage I in FIGS. 4-8 are only representative in nature and other input stages could be used with either single phase or three phase input signal and with or without power factor correcting.

By providing low fixed voltage on output bus 20 illustrated as lines 20a, 20b, the third stage of the novel three stage power source for welding can be a chopper or other converter operated at a frequency greater than 18 kHz. The switching frequencies of the unregulated inverter and the regulated output converter may be different. Indeed, normally the switching frequency of the chopper is substantially less than the frequency of unregulated inverter A. Power source PS4 shown in FIG. 9 illustrates the use of the present invention wherein stage III is a standard regulated converter 100 of the type used for electric arc welding. This converter is driven by fixed input DC bus 20 and is regulated by feedback from the welding operation 120 to provide current suitable for welding across output leads 102, 104. Leads 102 is a positive polarity lead and leads 104 is a negative polarity lead. In accordance with standard output technology for a two stage inverter based power sources, leads 102, 104 are directed to a standard polarity switch 110. This switch has a first position wherein lead 102 is directed to the electrode of the welding operation 120 so the output of polarity switch 110 has a positive polarity on output line 110a and a negative polarity on output line 110b. This produces an electrode positive DC welding process at weld operation 120. Reversal of polarity switch network 110 can produce an electrode negative DC welding process at weld operation 120. Thus, a DC welding process with either DC negative or DC positive can be performed according to the setting of the standard polarity switch 110. In a like manner, polarity switch 110 can be alternated between electrode negative and electrode positive to produce an AC welding process at weld operation 120. This is standard technology wherein polarity switch 110 drives the DC output from regulated converter 100 to produce either an AC welding process or a DC welding process. This process is regulated and controlled by a feedback system indicated as line or loop 122 directed to controller 130 for regulating converter 100 and for setting the polarity of switch 110 as indicated by lines 132, 134, respectively. By regulating the welding operation at stage III, the unregulated inverter at stage II can have a relatively higher switching frequency to reduce the component sizes within the second stage of the power source and can have close to 100% duty cycle switching to improve efficiency. The preferred embodiment of the three stage power source employs waveform control technology pioneered by The Lincoln Electric Company of Cleveland, Ohio. This type of control system is well known and is schematically illustrated in FIG. 9A wherein control circuit 150 processes a waveform profile as a voltage on line 152a is outputted from waveform generator 152. The waveform profile is controlled by feedback loop 122 as schematically illustrated by error amplifier 154 having an output 156. Thus, the profile of the waveform from generator 152 is controlled by the feedback loop 122 and produces a signal in output line 156. This line is directed to an appropriate pulse width modulator circuit 160 operated at a high frequency determined by the output of oscillator 162. This frequency is greater than 18 kHz and is often higher than 40 kHz. The regulated converter 100 preferably operates under 40 kHz. The output of the pulse width modulator, which is normally a digital circuit within controller 130, is shown as line 132 for controlling the waveform by way of regulated converter 100. In accordance with standard practice, the waveform of inverter 100 can have any profile, either AC or DC. This feature is schematically illustrated as waveform 152b, 152c and 152d at the right portion of FIG. 9A. Waveform 152b is an AC waveform of the type used in AC MIG welding where a higher negative electrode amperage is provided. A higher positive amperage is also common. In waveform 152c, the amperage for both electrode negative and electrode positive is essentially the same with the length of the negative electrode portion being greater. Of course, a process for AC welding can be adjusted to provide balanced AC waveforms or unbalanced AC waveforms, either in favor of electrode negative or electrode positive. When polarity switch 110 is set for either a DC negative or a DC positive welding operation, a pulse welding waveform, shown as waveform 152d, is controlled by waveform generator 152. Various other waveforms, both AC and DC, can be controlled by controller 130 so the welding operation 120 can be adjusted to be AC, or DC. Furthermore, the welding operation can be TIG, MIG, submerged arc or otherwise. Any process can be performed by power source PS4 or other power sources using the present invention. The electrode can be non-consumable or consumable, such as metal cored, flux cored or solid wire. A shielding gas may or may not be used according to the electrode being employed. A modification of power source PS4 to perform only DC welding is illustrated as power source PS5 in FIG. 10. In this power source, welding operation 120 performs only a DC welding operation so that feedback loop 122 is directed to controller 170 having an output 172. Regulated converter 100a is preferably a chopper to produce a DC voltage across lines 102a, 104a. Controller 170 is controlled by waveform generator 152, as shown in FIG. 9A. The polarity on lines 102a, 104a is either electrode negative or electrode positive according to the demand of the DC welding process performed at welding operation 120. Regulated converter 100a is more simplified than the welding output of power supply PS4 shown in FIG. 9. FIGS. 9 and 10, together with the control network or circuit 150 shown in FIG. 9A, illustrates the versatility of the novel three stage power source.

Figure 11:
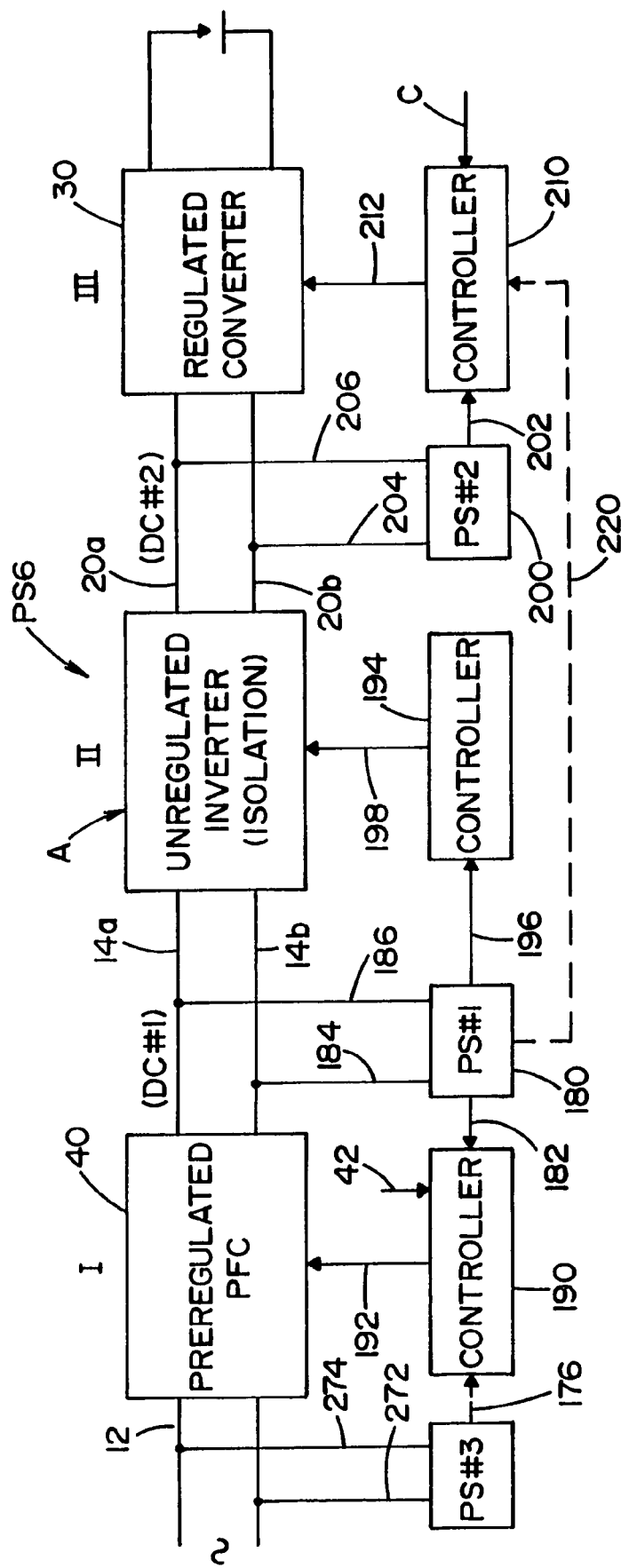
FIG. 11 is a block diagram illustrating the topography of the three stage power source for creating current suitable for electric arc welding with two separate controller control voltage supplies.

It is necessary to provide a voltage for operating the controllers for both the regulated and unregulated switching networks used in these two types of power sources. FIG. 11 illustrates the architecture and scheme employed to obtain control voltages to operate the various controllers of a three stage power source, such as power source PS6. The use of an output of a preregulator to provide the control voltage for the switching controller of the preregulator and switching controller of the second stage of a two stage power source is well known and is disclosed in Moriguchi U.S. Pat. No. 5,926,381, incorporated by reference herein. An output chopper for performing a welding operation routinely obtains the controller control voltage from the input DC voltage to the chopper. These two well known technologies are incorporated in power source PS6. The three stage power source can be operated with controllers having power supplies derived from various locations in the power source. Being more specific, power source PS6 has a power supply 180 with an output 182 and inputs 184, 186 from the first DC bus on leads 14a, 14b (DC#1). Power supply 180 includes a buck converter or flyback converter, not shown, to reduce the high voltage at the output of preregulator 40 of FIG. 2 to a low voltage on line 182. This control voltage may be between 5 and 20 volts. Voltage on line 182 is directed to controller 190 having an output lead 192 for performing the operation of preregulator 40 in accordance with standard technology. The preregulator has regulation feedback lines 42, 44 shown in FIGS. 2 and 3, but omitted in FIG. 11. Unregulated inverter A does not require a controller to modulate the duty cycle or the fixed relationship between the input and output voltages. However, it does require a controller 194 that receives controller operating voltage in line 196 from power supply 180. This arrangement is similar to the concept disclosed in Moriguchi U.S. Pat. No. 5,926,381, except second stage controller 194 is not a regulating controller as used in the two stage power source of the prior art. As an alternative, power supply PS#3 is driven by one phase of input 12 to give an optional power supply voltage shown as dashed line 176. Regulated output converter 30 of stage III has a power supply 200 labeled PS#2 with a controller voltage on line 202 determined by the voltage on DC bus 20 (DC#2) illustrated as including leads 20a, 20b. Again, power supply 200 includes a buck converter or flyback converter to convert the DC bus at the output of unregulated converter A to a lower voltage for use by controller 210 having an output 212. The signal on line 212 regulates the output of welding converter 30 in accordance with the feedback signal on line C, as discussed with respect to power sources PS1, PS2 in FIGS. 1 and 2, respectively. DC bus 14 (DC#1) and DC bus 20 (DC#2) provides input to power supplies 180, 200 which are DC to DC converters to produce low level DC control voltage for controllers 190, 194 and 210.

As an alternative shown by dashed line 220, power supply 180 labeled PS#2 can provide control voltage for controller 210. FIG. 11 has been disclosed to illustrate the versatility of using a three stage power source with controllers that can receive reduced supply voltages from various fixed DC voltage levels indicated to be PS#1 and PS#2. Other arrangements could be employed for providing the controller voltage, such as a rectified connection to one phase of AC input voltage 12 by a transformer in a manner illustrated as PS#3.

Figure 12:
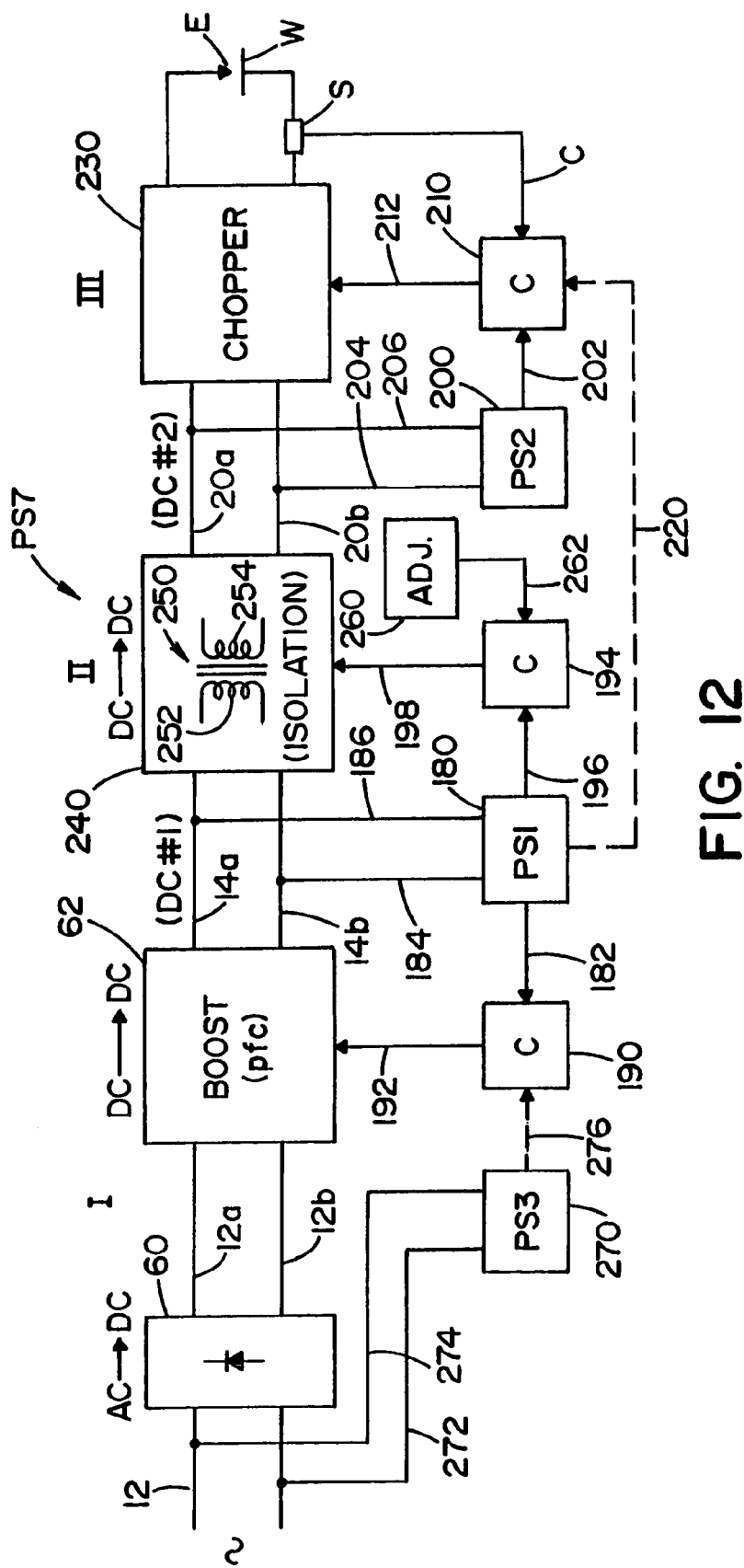
FIG. 12 is a block diagram illustrating a specific three stage power source employing the topography to which the present invention is directed.

Power source PS7 in FIG. 12 is similar to power source PS6 with components having the same identification numbers. The output stage III is a chopper 230 for directing a DC current between electrode E and workpiece W. Current shunt S provides the feedback signal C to controller 210. High switching speed inverter 240 of stage II has characteristics so far described with the isolation provided by transformer 250 having primary winding 252 and secondary winding 254. The primary side of DC to DC converter 240 is the switching network directing an alternating current to primary winding 252. The rectified output from secondary 254 is the secondary section or side of converter 240. Converter 240 employs a high switching speed inverter that has a duty cycle or phase shift set by controller 194. The switching frequency is about 100 kHz in the practical version of this power source. The duty cycle remains the same during the welding operation by chopper 230; however, the duty cycle or phase shift of the inverter may be adjusted as indicated by "ADJ" circuit 260 having an output 262 for adjusting controller 194. The duty cycle is normally close to 100% so that the switch pairs are conductive together their maximum times at the primary side of inverter 240. However, to change the fixed relationship between the first DC bus 14 and the second DC bus 20, circuit 260 can be used to adjust the duty cycle or phase shift. Thus, the unregulated, isolation inverter 240 is changed to have a different, but fixed duty cycle. However, the duty cycle normally is quite close to 100% so the switch pairs are operated essentially in unison. The duty cycle probably varies between 80-100% in normal applications of the three stage power source. In the preferred implementation of the novel power source, boost converter 62 shown in FIG. 4 is used for a power factor correcting input stage I. This boost converter is operated in accordance with controller 190 having a control voltage 182 as previously described. In accordance with a slight modification, supply 270 has a transformer connected by lines 274 across one phase of a single phase or three phase AC input 12. A rectifier and filter in power supply 270 produces a low control voltage in optimal dashed line 276 for use instead of the control voltage in line 182 if desired. These two alternatives do not affect the operating characteristics of power source PS7. Other such modifications of a three stage power source for electric arc welding can be obtained from the previous description and well known technology in the welding field.

Figure 13:
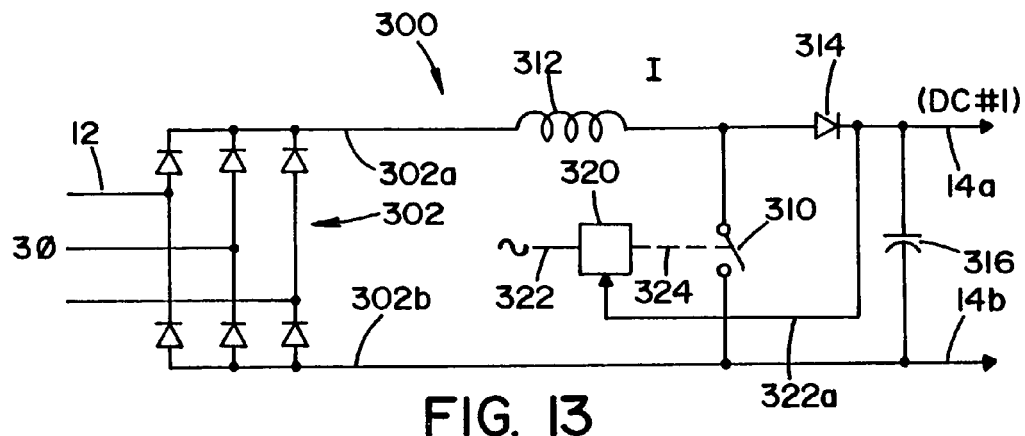
FIGS. 13-16 are wiring diagrams illustrating four different circuits for correcting the power factor in the first stage of the three stage power source.
Figure 14:
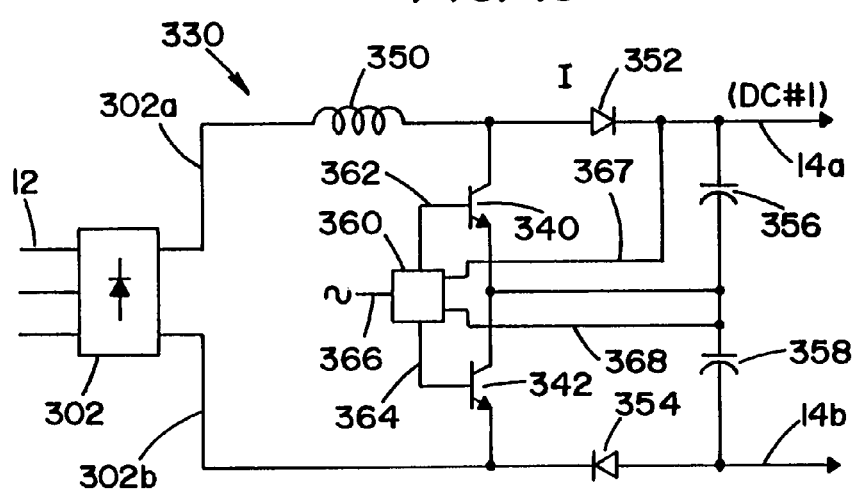
Figure 15:
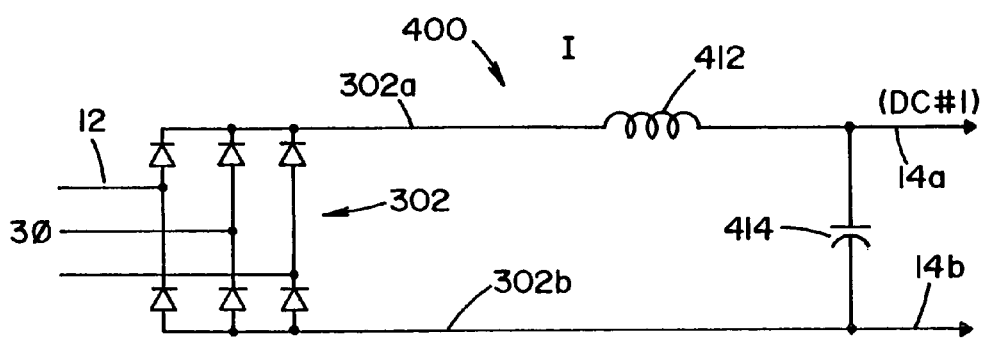
Figure 16:
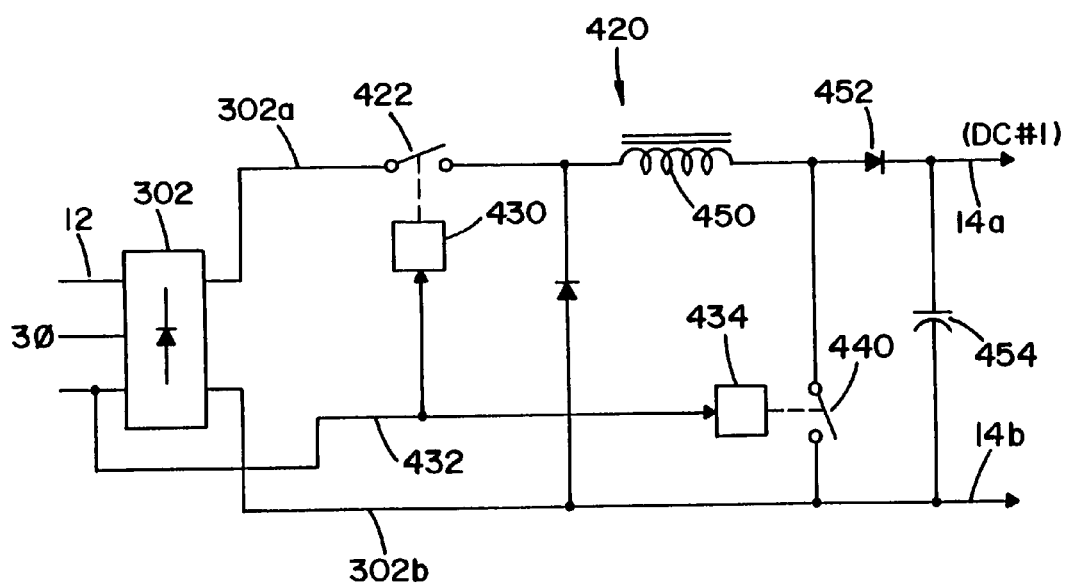

Input stage I normally includes a rectifier and a power factor correcting DC to DC converter as disclosed in FIGS. 4-8. These input stages can be used for both three phase and single phase AC signals of various magnitudes, represented as input 12. Certain aspects of an input stage for three phase AC input power are disclosed with respect to the circuits in FIGS. 13-16. Each of these circuits has a three phase input and a DC bus output (DC#1) that is obtained with a low harmonic distortion factor and a high power factor for the input stage. The disclosure in FIGS. 1-12 are generally applicable to the novel three stage power source; however, the particular stage I used is relevant to both a two stage power source of the prior art or the novel three stage power source. In FIG. 13, the input circuit 300 of stage I includes a three phase rectifier 302 with output leads 302a, 302b. Boost switch 310 is in series with an inductor 312, diode 314 and a parallel capacitor 316. An appropriate circuit 320 which is a standard power factor correcting chip has an input 322 to determine the input voltage, a regulation feedback line 322a and an output 324 for operating the boost switch to cause the current in input 12 to be generally in phase with the input voltage. This chip is a standard three phase power factor correcting boost converter chip that can be used in the present invention and is also used for a normal two stage power source. In a like manner, input circuit 330 shown in FIG. 14 has a three phase rectifier 302 with output leads 302a, 302b as previously described. A boost circuit including inductor 350, diodes 352, 354 and capacitors 356, 358 are used in conjunction with switches 340, 342 to provide coordination of the current at the output of circuit 330 and input voltage 12. To accomplish this objective, a control chip 360 provides gating pulses in lines 362, 364 in accordance with the sensed voltage in input 366 and feedback regulation signals in lines 367, 368. This is standard technology to provide three phase power factor correction of the type that forms the input of a two stage power source or the novel three stage power source. It has been found that the active three phase circuits 300, 330 when operated on a three phase input provide an input power factor of about 0.95. The power factor of a stage I when having a single phase AC input can be corrected upwardly to about 0.99. Since a three phase power source can generally be corrected only to a lower level, it has been found that a passive circuit for the input stage I of a two stage or three stage power source is somewhat commensurate with the ability of an active power factor correcting circuit. A standard passive circuit 400 is shown in FIG. 15, wherein each of the three phases is rectified by three phase rectifier 302 which directs DC current through output leads 302a, 302b to a filter circuit including inductor 412 and capacitor 414. It has been found that a passive circuit such as shown in FIG. 15 can correct the power factor of the three phase input to a level generally in the range of about 0.95. This is somewhat the same as the ability of an active circuit for a three phase input circuit. A buck+boost input circuit 420 is shown in FIG. 16. Rectified current on lines 302a, 302b is first bucked by switch 422 using standard power factor correcting chip 430 having a line #32 having a voltage waveform signal from input 12, that also steers chip 434 to operate boost switch 440. Switches 422, 440 are operated in unison to control the input power factor using a circuit containing inductor 450, diode 452 and capacitor 454. Circuits 300, 330, 400 and 420 are standard three phase passive power factor correcting circuits using standard technology and available switches controlled by the input voltage waveform and the current of DC#1. FIGS. 13-16 are illustrative of certain modifications that can be made to the first stage of the three stage power source. Of course, there is other technology for improving the power factor and reducing the harmonic distortion of both DC and AC signals of the type used to drive power sources of electric arc welders.

Figure 17:
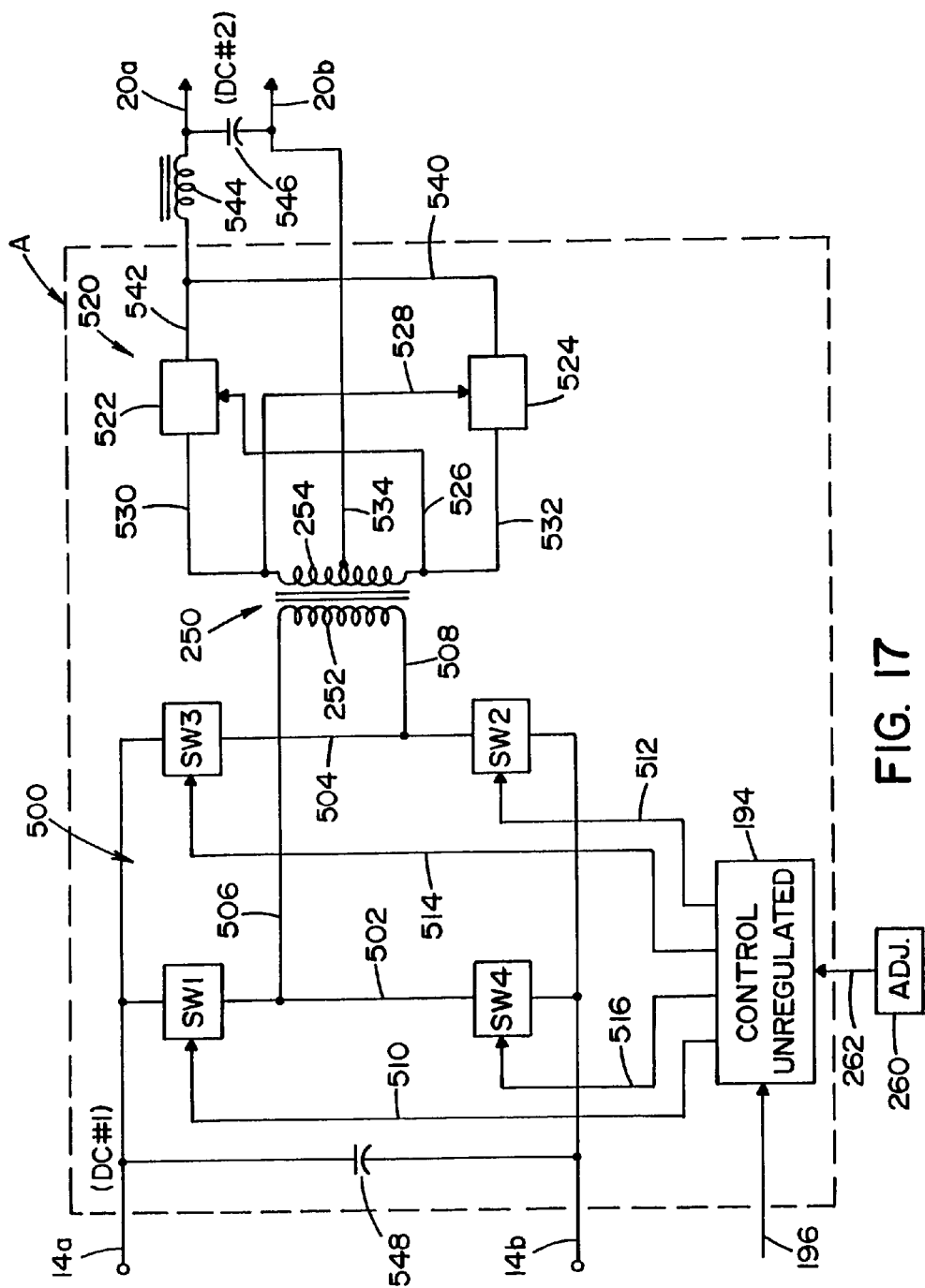
FIG. 17 is a combined block diagram and wiring diagram illustrating the preferred embodiment of the unregulated inverter constituting the novel second stage of the three stage power source to which the present invention is directed.

Unregulated inverter A of stage II can use various inverter circuits. The preferred circuit is illustrated in FIG. 17 wherein the inverter is divided between a primary section or side defined by the input to primary winding 252 of isolating transformer 250 and a secondary section or side defined by output of secondary winding 254. Referring first to the primary section or side of inverter A, full bridge circuit 500 is employed wherein paired switches SW1-SW3 and SW2-SW4 are across capacitor 548 are connected by leads 502, 504. The switches are energized in alternate sequence by gating pulses on lines 510, 512, 514, and 516, respectively. Controller 194 outputs gating pulses in lines 510-516 and an adjusted duty cycle determined by the logic on line 262 from circuit 260 as previously discussed. The duty cycle is controlled by changing the phase shift of lines 510 and 512 ad lines 514 and 516. Circuit 260 adjusts the duty cycle or phase shift of the paired switches. This adjustment is fixed during the operation of inverter A. In practice, circuit 500 has about 100% duty cycle or phase shift, where each pair of switches has maximum periods of overlapping conduction. Controller 194 has a control voltage from an appropriate supply indicated by line 196, as also previously described. In operation of circuit 500, an alternating current is directed through primary winding 252. This current has an ultra high frequency normally at least about 100 kHz so the components can be reduced in size, weight and cost. The high switching frequency is not dictated by the welding operation, but is selected for efficiency of unregulated stage A of the three stage power source. A block capacitor is in series with the primary winding to prevent saturation with unregulated gate drive signals. The secondary section or side of inverter A is a rectifier 520 having synchronous rectifier devices 522, 524. Synchronous rectifier devices are well known in the general electrical engineering art and are discussed in Boylan U.S. Pat. No. 6,618,274 incorporated by reference herein. These devices are gated by signals on lines 526, 528 created at the opposite ends of secondary winding 254 in accordance with standard technology. Leads 530, 532, and 534 form the output leads of rectifier 520 to create a DC voltage (DC#2) across leads 20a, 20b. The current is smooth by a choke 544 and is across capacitor 546, in accordance with standard welding technology. Inverter A is unregulated which means that it is not adjusted by a real time feedback signal from the welding operation. It merely converts DC bus 12 (DC#1) to DC bus 20 (DC#2). This conversion allows a substantial reduction in the voltage directed to the regulated third stage of the power source using inverter A. The reduction in voltage is primarily determined by the turns ratio of transformer 250, which ratio, in the preferred embodiment, is about 4:1. For DC #1, the voltage is around 400 volts. Thus, the fixed voltage on output bus 20 is about ¼ the fixed voltage on output bus 12 of the first stage. Several advantages of an unregulated stage are contained in an article entitled *The incredible Shrinking (Unregulated) Power Supply* by Dr. Ray Ridley incorporated by reference herein as background information. A basic advantage is the ability to increase the frequency to above 100 kHz to reduce the size and cost of the inverter stage.

Figure 18:
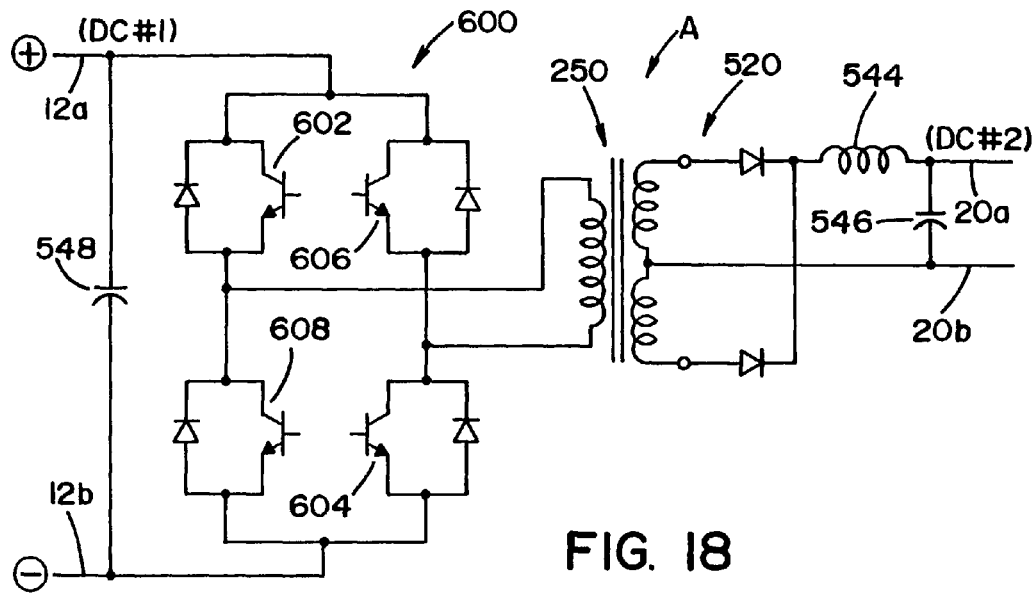
FIGS. 18-21 are wiring diagrams showing several inverters used as the second stage unregulated, isolation inverter comprising the novel aspect of the three stage power source to which the present invention is directed.
Figure 19:
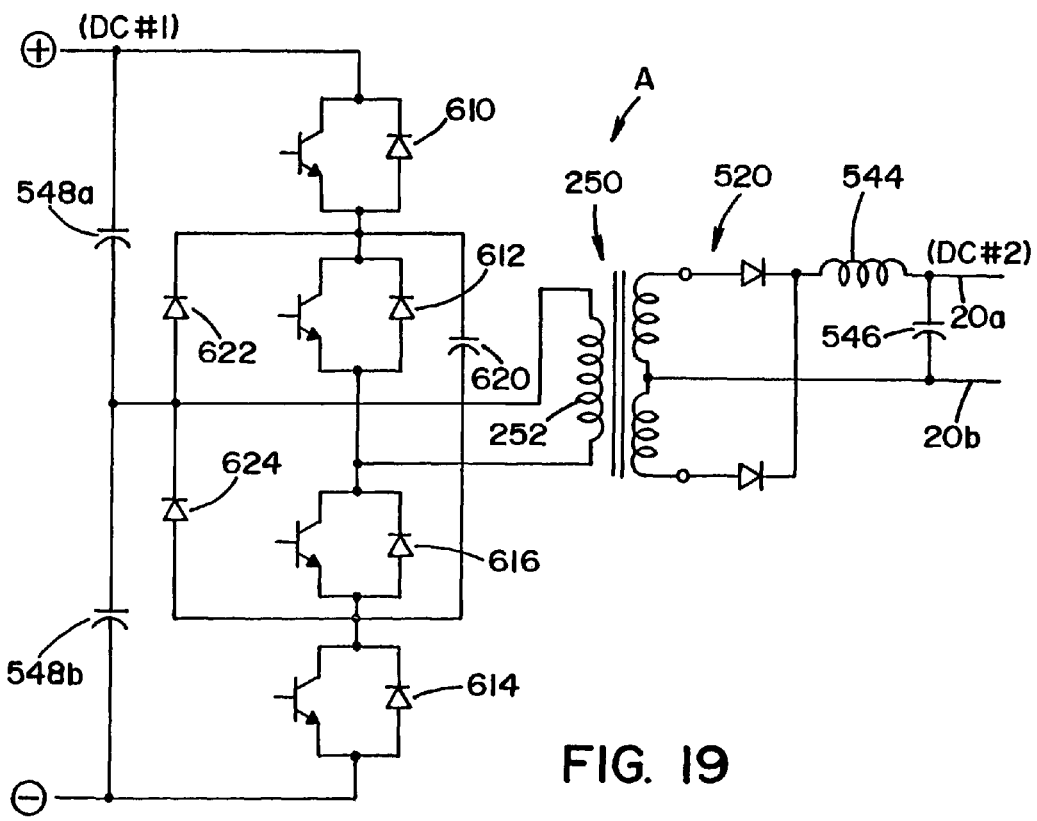
Figure 20:
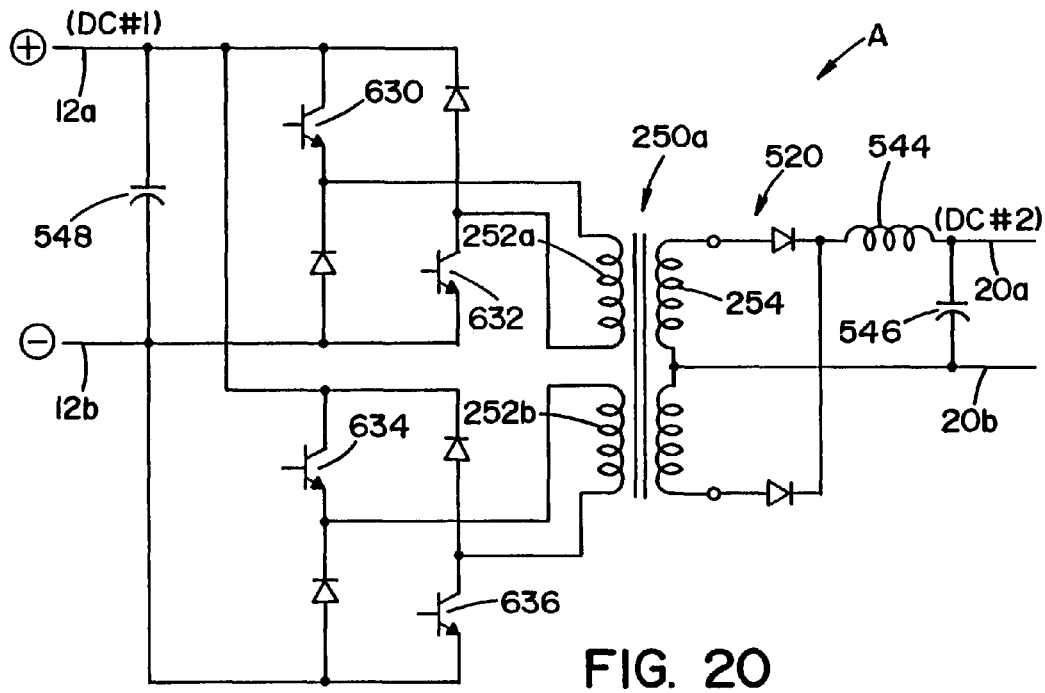
Figure 21:
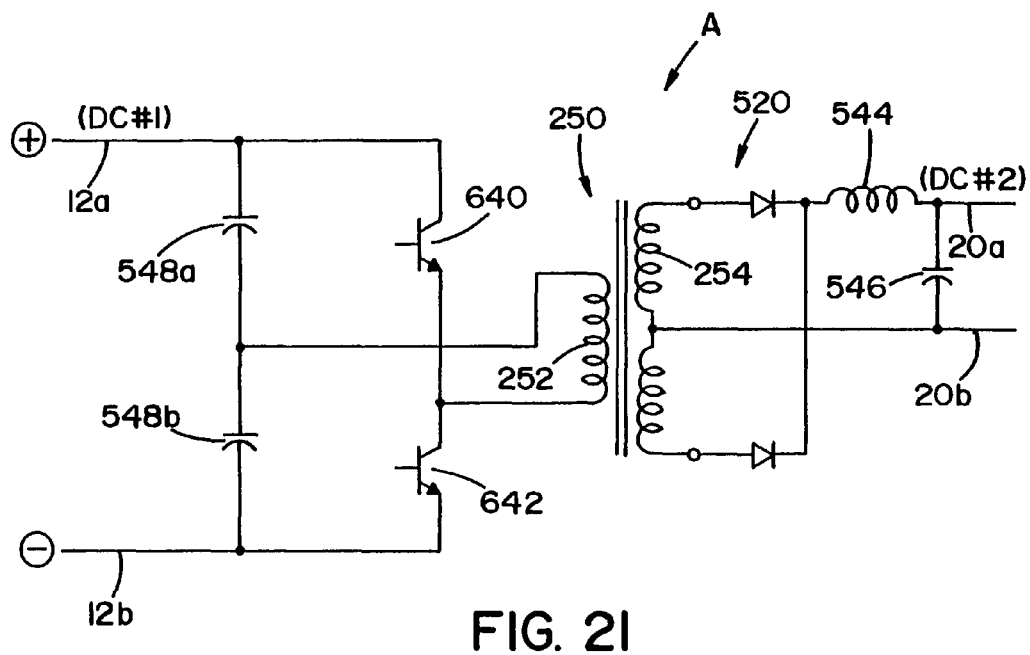

Various circuits can be used for the unregulated inverter A constituting novel stage II of the invention. The particular type of inverter is not controlling. Several inverters have been used. Some are illustrated in FIGS. 18-21. In FIG. 18, inverter A is shown as using a full bridge circuit 600 on the primary side of transformer 250. A switch and diode parallel circuit 602, 604, 606 and 608 are operated in accordance with the standard phase shift full bridge technology, as explained with respect to the inverter A version shown in FIG. 17. A modification of the internal workings for inverter A is illustrated in FIG. 19 utilizing a cascaded bridge with series mounted switch circuits 610, 612 and 614, 616. These switch circuits are operated similar to a half bridge and include input capacitors 548a, 548b providing energy for the switching circuits which in parallel is capacitor 620 and is in series with diode 622, 624. The two switch circuits are in series so there is a reduced voltage across individual switches when a phase shift control technique similar to the technique for the full bridge inverter of FIG. 17 is used. This type of inverter switching network is illustrated in Canales-Abarca U.S. Pat. No. 6,349, 044 incorporated by reference herein showing an inverter using a cascaded bridge, sometimes referred to as a three level inverter. A double forward inverter is shown in FIG. 20 wherein switches 630, 632 provide a pulse in section 252a of the primary winding for transformer 250a. In a like manner, switches 634, 636 are operated in unison to provide an opposite polarity pulse in primary section 252b. The alternating pulse produces an AC at the primary winding of transformer 250a to produce an isolated DC output in secondary winding 254. A standard half bridge circuit is shown as the architecture of inverter A in FIG. 21. This half bridge includes switches 640, 642 alternately switched to produce an AC in primary winding 252 of transformer 250. These and other switching circuits can be used to provide an AC signal in the primary winding of transformer 250 so that the secondary isolated AC signal is rectified and outputted on leads 20a, 20b as DC#2. The mere description of certain representative standard switching networks is not considered to be exhaustive, but just illustrative. Control of the welding current is not performed in the second stage. In this stage, a DC bus having a high voltage is converted to a fixed DC bus (DC#2) having a low voltage for the purposes of driving a third stage, which third stage is a regulated stage to provide a current suitable for electric arc welding. Electric arc welding incorporates and is intended to include other welding related applications, such as the concept of plasma cutting. The various circuits used in the three stages can be combined to construct various architectures for the basic topography which is a three stage power source.

PREFERRED EMBODIMENT

FIGS. 22-24

This description relates to FIGS. 22-27 and uses the numbers of those figures to indicate like components, while using some relevant numbers from FIGS. 1-17. The 600 numbers in FIGS. 18-21 are not used for the same components in FIGS. 22-27. In FIG. 22 the first two stages of the improved three stage power source includes unregulated converter A as best shown in FIG. 17 wherein the input DC signal across lines 14a, 14b is provided by a novel first input stage shown as boost converter 600 (FIG. 22) having power switch 602 (FIG. 22) switched by a gate signal in line 604 (FIG. 22). Switch 602 (FIG. 22) is turned on after auxiliary switch 628 is turned on. The timing of gating signals in lines 192 and 192a is by power factor correcting controller 194. A high frequency signal in line 192 causes a high frequency switching signal in gate 604 (FIG. 22) of main power switch 602 (FIG. 22) with anti-parallel diode 602a, in accordance with standard boost technology. The timing of the signal on gate 604 (FIG. 22) is controlled in accordance with previous discussions to obtain power factor correction for the power supply creating the rectified signal on input leads 12a, 12b. The DC signal at leads 12a, 12b is converted by switch 602 and output rectifier diode 610 (FIG. 22) into a DC bus at leads 14a, 14b. The invention involves the use of an active soft switching circuit 620 (FIG. 22) having a network including a first branch with inductor 622 (FIG. 22) and a second branch with parasitic capacitor 624 (FIG. 22). The network is actuated by series connected auxiliary switch 628. Some discussions identify this two branch network as a tank circuit or resonant circuit. This is technically justified but not necessary to the soft switching function. Capacitor 624 (FIG. 22) and inductor 622 (FIG. 22) form a filter circuit for soft switching 628 (FIG. 22) wherein capacitor 640 causes a soft voltage turn on of boost diode 610 (FIG. 22) by way of diode D2. This boost diode is sometimes referred to as an output or rectifier diode. Circuit 620 (FIG. 22) is an active soft switching circuit controlling the voltage and current across power switch 602 (FIG. 22) events and also across output diode 610. Thus, power switch 602 (FIG. 22) and boost or output diode 610 (FIG. 22) in boost converter 600 (FIG. 22) are commutated with soft switching. This feature makes the switching technique particularly attractive for high voltage conversion applications where the boost diode suffers from severe reverse recovery problems. For instance, in a power factor correcting boost circuit, both the power switch and the rectifier diode are subject to high voltages. With the conventional pulse width modulator technique employed, due to the reverse recovery of minority-rectifier diode 610 (FIG. 22), high switching loss, high EMI noise, and device failure problems become more pronounced. Therefore implementation of the soft switching for both power switch 602 (FIG. 22) and diode 610 (FIG. 22) is beneficial. The voltage and current waveforms of the switches in the converter are essentially square wave except during the turn on and turn off switching intervals when the zero voltage switching transition takes place. Both the power switch and the boost diode are subject to a minimum voltage and current stress. Auxiliary switch 628 can be very small compared to the main switch, as it only handles small amounts of resonant-transition energy. Since soft switching is achieved without increasing switching voltage and current stresses, there is no substantial increase in the conduction loss when using active circuit 620 (FIG. 22). Basically, circuit 620 (FIG. 22) is selected to provide soft switching in both current and voltage at transitions of power switch 602 (FIG. 22) and, optionally, at transitions of output diode 610 (FIG. 22). Thus, a two stage converter is used to convert the DC signal on lines 12a, 12b to a DC signal in lines 20a, 20b. The efficiency of this two stage device is drastically increased by having a soft switching circuit on boost converter 600 (FIG. 22) and using the inherent soft switching of unregulated inverter A. Consequently, the two stage DC to DC converter shown in FIG. 22 is a substantial improvement for the input side of a three stage welding power source. In operation, a high frequency switching signal in line 192, which signal exceeds 18 kHz, first energizes auxiliary switch 628 by the gating signal in line 192a to activate the resonant tank circuit formed by inductor 622 (FIG. 22) and capacitor 624 (FIG. 22). After switch 628 has been turned on, main switch 602 (FIG. 22) is turned on. This causes soft switching both in current and voltage. At the same time, the passive portion of circuit 620 (FIG. 22) controls the voltage and current across output rectifier diode 610 (FIG. 22). The positive polarity side of auxiliary switch 628 is clamped to capacitor 640 (FIG. 22) by diode D1. This clamps the soft switching circuit to the positive output, the circuit including inductance and capacitance branches does not float during operation. The circuit shown in FIG. 22 is discussed in the 1991 IEEE article entitled *High Efficiency Telecom Rectifier Using a Novel Soft-Switching Boost-Based Input Current Shaper*. This article is being incorporated by reference herein. A similar soft switching circuit for the power switch 602 (FIG. 22) is described in a 2004 IEEE article entitled *A New ZVT-ZCT-PWM DC-DC Converter*. This similar type active soft switching circuit used for power switch 602 (FIG. 22) is shown in FIG. 23 wherein the numbers for the same components as shown in FIG. 22 are the same. The 600 numbers are not those in FIGS. 18-21. Active soft switching circuit 700 has resonant inductors 704, 706 divided into segments and coupled by common core 705. Current controlling diodes 704a, 706a, respectively. These diodes are in series with the inductors which are, in turn, parallel with parasitic capacitance 708. Auxiliary switch 710 has an anti-parallel diode 712 so that switch 710 operates in accordance with the previously discussed auxiliary switch 628 of FIG. 22. Soft switching circuit 700 includes voltage control capacitor 720 for controlling the voltage across output rectifier diode 610 (FIG. 22). To clamp the positive side of auxiliary switch 710 to output lead 14a, there is provided a single diode 730. This diode operates as diode D1, D2 in FIG. 22. Soft switching circuit 700 provides soft switching, both voltage and current across power switch 602 (FIG. 22) and control the voltage and current during the switching of rectifier diode 610 (FIG. 22). Thus, circuit 700 essentially operates in the same fashion as previously discussed soft switching circuit 600 (FIG. 22). The present invention involves an active soft switching circuit for the power switch 602 (FIG. 22) and optionally for the rectifier diode 610 (FIG. 22). The topography for the soft switching circuits may vary, with two of the preferred soft switching circuits 600 (FIG. 22), 700, illustrated in FIGS. 22, 23, respectively. The switches SW1, SW2, SW3 and SW4 are solid state switches with an anti-parallel diode, such as diode 602a. Furthermore, a capacitor 506a prevents saturation of transformer core 250a.

By providing an active soft switching circuit for the boost input stage of the three stage power source, the operation of the input stage combines with the inherent soft switching characteristics of the second unregulated inverter stage to provide a two stage input that improves the efficiency of the novel three stage power source, as described in FIGS. 1-21. It has been found that circuit 700 pushes the voltage down closer to zero during high speed switching of switch 602 (FIG. 22). Circuit 600 (FIG. 22) lowers the voltage, but the voltage during switching using circuit 600 (FIG. 22) is not exactly zero. Indeed, it may be as high as about 50 volts. Consequently, soft switching circuit 600 (FIG. 22) is preferred because of its lower cost and soft switching circuit 700 is an alternative because of its ability to push the actual voltage down near zero during the switching of switch 602 (FIG. 22). These distinctions are the reasons for illustrating two separate active soft switching circuits for use on the input stage of the novel three stage power source as described above.

The three phase power source as described in FIG. 12 is illustrated again in FIG. 24, using like numbers, wherein chopper 230 is shown as having power switch 750 controlled by high frequency gating signal on line 212 from controller 210. A feedback signal on line 762 from current sensing device 760 is generated by readings of shunt S. In a like manner, a voltage feedback signal is directed to controller 210 by line 772 from a voltage sensing device 770. These two feedback signals control the operation of a pulse width modulator in controller 210 for operating power switch 750 of chopper 230. Input capacitor 780 controls the voltage across input leads 20a, 20b in accordance with standard practice. An optional aspect of the invention is providing a passive soft switching circuit 800 for chopper 230, which passive soft switching of the chopper is combined with the active soft switching of the input stage and the inherent soft switching of the second stage to increase the efficiency of the three stage power source shown in FIG. 12 and described in FIGS. 1-21. Soft switching circuit 800 is a commonly used soft switching circuit. The circuit includes inductor 802 for controlling current across the power switch and diode D4. Capacitor 806 controls the voltage across the power switch during the switching operations. Capacitors 804 and 806 are connected by diodes D1, D2, D3 and D4. These two capacitors control the voltage across diode D4. Thus, power switch 750 and diode D4 are soft switched in both current and voltage during switching operations. This circuit is shown in the University of California article entitled *Properties and Synthesis of Passive, Lossless Soft-Switching PWM Converters*. This May 1997 article is incorporated by reference herein to explain the operation of the commonly used passive soft switching circuit 800. In essence, chopper 230 has a power switch with a soft switching circuit to control both the current and voltage during turn-on and turn-off transitions. In other words, output chopper 230 is provided with a soft switching circuit, which soft switching circuit controls both voltage and current at the appropriate time during the switching operations.

The three stage power source described in FIGS. 1-21 is provided with an input stage having an active soft switching circuit which combines with the inherent soft switching of unregulated inverter A of the second stage to increase the overall efficiency by reducing the switching losses and conduction losses at the input side of the power source. As an option, the chopper output stage is provided with a passive soft switching circuit to provide an inexpensive final stage. The chopper may be a separate, replaceable module without the need for a circuit modification to control an auxiliary switch as required in an active soft switching circuit. The input portion of the three stage power source includes an active power factor correcting stage combined with an unregulated phase shift pulse width modulating stage. This novel combination of the first two stages is highly efficient and inexpensive as a topography for electric arc welders.

FIGS. 25 and 26, the show first stage 600 is of FIG. 22 as a boost type DC to DC converter including an inductor 644 coupled between the input lead 12a and a main internal node 603, a main switching device 602 (FIG. 22) with a body diode 602a coupled between the internal node 603 and the lower converter input lead 12b. A main rectifier diode 610 (FIG. 22) is coupled with its anode at node 603 and its cathode at output lead 14a. Optional output filter capacitor 548 is connected across the output leads 14a, 14b. As in normal boost converter operation, main switch 602 (FIG. 22) is activated by a pulse width modulated (PWM) control signal at a control gate thereof to switch between a conducting (ON) state in which the internal node 603 is brought essentially to the voltage at the lower lead 12b (charge phase), and a non conducting (OFF) state (discharge phase). Prior to each charging phase, assuming that the main switching device 602 (FIG. 22) has been in the non conducting state (OFF) for a relatively long time, the voltage across output capacitor 548 is equal to the input voltage plus the voltage of inductor 644. Closure of the main switch 602 (FIG. 22) brings node 603 essentially to the voltage of lower lead 12b, whereby the input voltage is impressed across inductor 644 (terminal 12a is positive with respect to node 603) and main diode 610 FIG. 22) prevents filter capacitor 548 from discharging through main switch 602 (FIG. 22). The voltage across inductor 644 causes the current therethrough to rise over time, with the corresponding energy being stored in inductor 644. Thereafter, main switch 602 (FIG. 22) is deactivated (OFF) to begin a discharge phase. Placing switch 602 (FIG. 22) in the non conducting state causes the main inductor voltage to change such that the voltage at node 603 rises to maintain the current through inductor 644 at a constant value, wherein for the inductor current to continue flowing, the voltage at node 603 must rise enough to forward bias diode 610, as shown in FIG. 22 (e.g., approximately the output voltage across capacitor 548 plus a diode drop), wherein the inductor voltage changes polarity in the discharge phase. For large output capacitance 548, the output voltage between leads 14a and 14b remains generally constant during the discharge phase, wherein the charging and discharging (switching of main switch 602 (FIG. 22) on and off) is repeated with appropriate feedback to regulate the pulse width modulation of the switch control signal, such that output voltage across the capacitor 548 can be maintained at a desired DC value.

In general, it is desirable to maximize the efficiency of each stage in the power source, wherein the on state resistance of main switch 602 (FIG. 22), the diode forward voltage drop, and the reverse recovery time ratings for main diode 610 (FIG. 22) are ideally minimized to combat conduction losses. Another consideration is minimization of switching losses and noise generation in converter stage 600 (FIG. 22), wherein it is desirable to control the conditions under which the state transitions of switch 602 (FIG. 22) and diode 610 (FIG. 22) occur. In particular, soft switching circuits may be advantageously employed in boost converter 600 (FIG. 22) to provide zero voltage switch turn on and turn off, as well as zero voltage or zero current turn off of diode 610 (FIG. 22). Absent counter measures, the switching of main switch 602 (FIG. 22) causes undesirable power loss and stress to switch 602 (FIG. 22) and/or to main diode 610 (FIG. 22). Accordingly, soft switching or snubber circuitry is employed in boost converter stage 600 (FIG. 22) to provide low current and or low voltage switching of these components. In this regard, soft switching circuitry may be used to minimize the rate of voltage rise across switch 602 as shown in FIG. 22 (e.g., dv/dt at node 603) when switch 602 (FIG. 22) is turned off, and to minimize the voltage across switch 602 when switch 602 (FIG. 22) is turned on, as well as to minimize one or both of the voltage or current of diode 610 (FIG. 22) during reversal thereof, in order to minimize switching losses and noise emission.

The soft start switching circuit shown in Hua U.S. Pat. No. 5,418,704 can be used in boost stage 600 of the three stage power source as schematically shown in FIG. 24. This patent is incorporated by reference and is different from the first embodiment circuit shown in FIG. 25 and the preferred embodiment circuit shown in FIG. 26. The soft switching circuit described in Hua U.S. Pat. No. 5,418,704 employs an auxiliary switch with a resonant inductor and capacitor to provide zero-voltage switching of the boost converter main switch and the output diode. This is a publication referring to the two branch network of the invention as a resonant circuit. In Hua, the auxiliary switch and the resonant inductor are connected in series across the main converter switch. The auxiliary switch is switched on immediately prior to turning on the main switch so the resonant inductor is diode coupled to the positive converter output lead to limit the rate of change of the main diode current. Activation of the auxiliary switch of Hua also discharged the internal node to zero volts, thereby ensuring that the main switch was turned on at essentially zero voltage. However, Hua suffers from hard switching conditions during main transistor turn-off. In particular, the upper main switch terminal voltage of Hua must be higher than the converter output voltage before the resonant inductor can conduct any current to the output, whereby the resonant inductor of Hua causes very fast transistor voltage rise (hi dv/dt) during transistor turn off, leading to unacceptable switching losses.

As illustrated in FIGS. 25 and 26, exemplary boost converter stage 600 (FIG. 22) includes an active soft switching circuit 601 or 601a, respectively, for providing soft switching of main switch 602 (FIG. 22) and main diode 610 (FIG. 22). The exemplary soft switching circuit 601 in FIG. 25, which is the original version of the invention, is a three terminal network having first and second terminals coupled across main switch 602 (FIG. 22) and a third terminal coupled to the cathode of main diode 610 (FIG. 22). The soft switching circuit or network includes inductor 622 (FIG. 22), auxiliary switching device 628 with diode 630 (FIG. 22). First and second diodes D1 and D2, along with capacitors 624 and 640 (FIG. 22) complete a three terminal snubber circuit. Main and auxiliary switching devices 602 (FIG. 22) and 628 can be any suitable devices that selectively provide generally conductive and generally non conductive states between first and second power terminals thereof according to a control signal at a control terminal thereof, including, but not limited to, bipolar transistors, metal oxide semiconductor (MOS) devices, isolated gate bipolar transistors (IGBTs) and the like. Inductor 622 (FIG. 22) is in a first branch in parallel with switch 602 (FIG. 22). Inductor 622 (FIG. 22) has a first terminal coupled with main inductor 644 and a second terminal attached to a first intermediate circuit node 607. Auxiliary switching device 628 is coupled between node 607 and converter leads 12b, 14b. Diode 630 (FIG. 22) may be a body diode of auxiliary switching device 628 or may be a separate component. An anode of diode 630 (FIG. 22) is coupled to lower converter leads 12b, 14b and its cathode is coupled to node 607 at the connection of the auxiliary switch 628 and the resonant inductor 622 (FIG. 22). Similar to the circuit of Hua, one capacitor 624 (FIG. 22) is coupled in the circuit 601 across main switch 602 (FIG. 22). Unlike Hua, however, soft switching circuit 601 in FIG. 25 has a second intermediate node 609 with second capacitor 640 (FIG. 22) coupled between nodes 603 and 609. First diode D1 of soft switching circuit or network 601 has an anode coupled with first internal node 607 and a cathode coupled with second internal node 609. Diode D2 has an anode coupled with second internal node 609 and a cathode coupled to the cathode of main diode 610 (FIG. 22) at the upper converter output terminal 14a.

As a technical advance over Hua with its hard switching of the auxiliary switch, soft switching circuit 601 of FIG. 25 provides soft switching operation for turn on and turn off of both main switch 602 (FIG. 22) and main diode 610 (FIG. 22) as well as auxiliary switch 628. This improvement achieves better efficiency, lower component stresses, and less noise generation. Prior to turning on main switch 602 (FIG. 22), auxiliary switch 628 is switched on while the voltage at node 603 is equal to the output voltage, where the closure of the auxiliary switch 628 causes the current through resonant inductor 622 (FIG. 22) to rise initially to the main inductor current level, by which main diode 610 (FIG. 22) reverses. As diode 610 (FIG. 22) recovers the voltage reversal and begins to block current from the output, the current from inductors 644 and 622 (FIG. 22) discharges capacitor 624 (FIG. 22), wherein the voltage across diode 610 (FIG. 22) remains small during the reversal to minimize the diode switching loss and noise generation. Main switch 602 (FIG. 22) is then switched on when capacitor 624 (FIG. 22) is discharged (e.g., when the voltage across switch 602 (FIG. 22) is zero), and auxiliary switch 628 is turned off. The current through the resonant inductor 622 (FIG. 22) charges first resonant capacitor 640 (FIG. 22) through diode D1 and also charges any parasitic capacitance of the auxiliary switch 628, whereby the voltage at nodes 607 and 609 rise toward the level of the converter output and diode D2 begins to conduct. Any remaining energy from the inductor 622 (FIG. 22) is provided to the output through diodes D1 and D2. Main switch 602 (FIG. 22) is then turned off (at a time dependent upon the current pulse width modulation based on output level feedback) while the switch voltage is essentially zero. The current through main inductor 644 charges capacitor 624 (FIG. 22) and discharges resonant capacitor 640 (FIG. 22) through diode D2. This action causes the voltage at node 607 to rise to the output value, after which main diode 610 (FIG. 22) again begins to conduct current to the output.

In operation of the circuit 601 of FIG. 25, the main inductor current flows through capacitor 640 (FIG. 22) and second diode D2 when main switch 602 (FIG. 22) is initially turned off, where main diode 610 (FIG. 22) begins to conductor after resonant capacitor 640 (FIG. 22) discharges, wherein the voltage across first capacitor 640 (FIG. 22) is a function of its capacitance, the main current level, and the duty cycle of pulse width modulated main switch 602 (FIG. 22). In this manner, the switching losses of main diode 610 (FIG. 22) can be reduced or minimized by ensuring zero diode voltage when the diode begins to conduct current to output capacitor 548. With main switch 602 (FIG. 22) in the on state, the voltage across first resonant capacitor 640 (FIG. 22) remains generally constant because first diode D1 prevents capacitor charging, except when auxiliary switch 628 is first turned off and the voltage at node 607 is higher than the voltage across the capacitor 640 (FIG. 22). Ideally, main switch 602 (FIG. 22) has a zero voltage turn off condition if resonant capacitor 640 (FIG. 22) is fully discharged during the boost phase with switch 602 (FIG. 22) on. However, main switch 602 (FIG. 22) will experience a non zero turn off voltage if resonant capacitor 640 (FIG. 22) is not fully discharged. In addition, capacitor 640 (FIG. 22) may only provide a current bypass path for auxiliary inductor 622 (FIG. 22) when auxiliary switch 628 is turned off, without providing sufficient bypass conduction path for parasitic inductances in the auxiliary circuit loop in soft switching circuit 606 of FIG. 25. As a result, the transition of auxiliary switch 628 from on to off may be at a non zero voltage, whereby switching losses and noise generation are possible, along with possible stress to switch 628.

FIG. 26 illustrates the preferred embodiment and preferred design of the soft switching circuit 601a, and in accordance with the invention, has capacitor 624 (FIG. 22) removed. A second capacitor 640a is coupled between internal node 609 and lower converter leads 12b, 14b, whereby a net capacitance results from the series combination of capacitors 640 (FIG. 22) and 640a, with this series combination being a branch parallel across main switch 602 (FIG. 22). Lower (second) capacitor 640a is in parallel across auxiliary switch 628 via diode D1. In one particular implementation, lower capacitor 640a is substantially smaller than the upper capacitor 640 (FIG. 22). Thus, unlike the soft switching network of FIG. 25, circuit 601a of FIG. 26 provides capacitor 624 (FIG. 22) between second internal node 609 and lower converter leads 12b, 14b as two capacitors 640 (FIG. 22), 640a. This geometry aids in providing soft switching for auxiliary switch 628 (e.g., reduces dv/dt across switch 628).

Referring now to FIG. 27, graph 900 illustrates various exemplary waveforms associated with main and auxiliary switches 602 (FIG. 22) and 628, respectively, in boost converter stage 600. The exemplary active soft switching circuit 601a of FIG. 26 is also shown. The graph 900 shows voltage waveform 810 corresponding to an auxiliary switch control voltage signal (e.g., gate signal VGS, base signal VBE, etc., depending on switch type), voltage waveform 820 representing the voltage across auxiliary switch 628 (e.g., the voltage between internal node 607 and lower converter leads 12b, 14b), and current waveform 830 illustrating the current switched through auxiliary switch 628. In addition, graph 800 also provides voltage waveform 840 showing a control voltage signal for main switch 602 (FIG. 22) as well as a voltage waveform 850 representing the voltage across main switch 602 (e.g., the voltage between node 603 and lower converter leads 12b, 14b.

Various discreet times are illustrated in a typical switching cycle of converter stage 600 (FIG. 22) in the graph 900, including time 870, at which time main switch 602 (FIG. 22) is turned off (e.g., falling edge of voltage waveform 840), time 872 when auxiliary switch 628 is turned on (rising edge on control signal 810), and time 874 when auxiliary switch 628 is turned off and main switch 602 (FIG. 22) is turned on (falling edge on waveform 810 and rising edge on waveform 840). While illustrated as being switched simultaneously at time 874, auxiliary switch 628 may alternatively be turned off prior to, concurrently with, or after the time when main switch 602 (FIG. 22) is turned on, wherein all such variant implementations are deemed as falling within the scope of the invention and the appended claims. In the illustrated implementation of the circuit shown in FIG. 26, main switch 602 (FIG. 22) is turned off at time 870, after which the voltages across main and auxiliary switches 602 (FIG. 22) and 628 (e.g., voltages at nodes 603 and 607) rise as indicated in graph 900 at portion 852 and portion 822, respectively. It is noted that the voltage curve 850 is zero across main switch 602 (FIG. 22) during main switch turn on at time 870, whereby any corresponding switching losses and/or noise emission are mitigated. As shown in FIG. 27, switch voltage curves 820 and 850 remain essentially constant at portion 824 and portion 854 with a value generally equal to the value of the voltage across output filter capacitor 548 (VOUT) until time 872 when auxiliary switch 628 is turned on (with main switch 602 (FIG. 22) remaining off), whereby the auxiliary switch voltage drops to zero at point 826. It is noted that auxiliary switch current curve 830 is essentially zero at time 872, whereby auxiliary switch 628 suffers no significant turn on switching loss. Thereafter, at time 874, main switch 602 (FIG. 22) is again turned on. It is noted that between time 872 and time 874, main switch voltage curve 850 drops generally at portion 856 to zero prior to switch 602 (FIG. 22) being turned on, whereby a zero voltage turn on condition is provided to minimize switch loss and noise generation by main switch 602 (FIG. 22). Moreover, unlike the circuit or network 601 in FIG. 25 above, auxiliary current curve 830 initially rises at portion 832 after the auxiliary switch turn on time 872, but is then reduced to zero at portion 834 prior to the auxiliary switch turn off time 874, whereby the auxiliary switch turn off is a soft switching event with minimized (e.g., zero) switching loss and noise emission. Main switch 602 (FIG. 22) is then turned on at 874 at essentially zero volts, and the auxiliary switch voltage 820 rises at portion 828 until a time 876 at which the current through resonant inductor 622 (FIG. 22) falls to zero. Thereafter, the cycle continues until the next time 870, at which main switch 602 (FIG. 22) is again turned off, wherein the amount of time that main switch 602 (FIG. 22) remains on in a given switching cycle may be determined by output regulation conditions through pulse width modulation or other suitable techniques. Circuit 601a of FIG. 26 provides soft switching of auxiliary switch 628 while the auxiliary switch 628 in circuit 601 has a hard turn off. This is a distinct improvement obtained by the preferred circuit 601a of FIG. 26.

The soft switching system or network 601, 601a of FIGS. 25 and 26, respectively, includes two parallel branches parallel to main power switch 602 (FIG. 22). A first branch includes the inductance of inductor 622 (FIG. 22) controlling the current to auxiliary switch 628, switch 602 (FIG. 22) and diode 610 (FIG. 22), while the second branch has a capacitance controlling voltage across switch 602. In FIG. 26, this parallel branch is divided into two capacitors, one of which controls the voltage across auxiliary switch 628.

The capacitance of capacitors 640 (FIG. 22), 640a of FIG. 26 generally equals the capacitance of capacitor 624 of FIG. 25. Capacitor 640 (FIG. 22) soft switches switch 628 as it is turned off. As switch 628 is turned off capacitor 640a is at zero voltage. It charges slowly to provide soft turnoff. When switch 628 is turned on, current in the switch increases slowly through inductor 622 (FIG. 22) and diode 610 (FIG. 22) is turned off slowly by slow current rise in the inductor. Thus, network 601a soft switches switch 628 during on and off cycles and controls current through boost or output diode 610 (FIG. 22). This is an improvement over network 601 of FIG. 25.

The various switching circuits and power source topologies disclosed can be combined in several ways to accomplish the objectives and advantages of the claimed invention.

Having thus defined the invention, the following is claimed:

1. A three stage power source for an electric arc welding process, said power source comprising an input stage having an AC input and a first fixed DC output signal; a second stage in the form of an unregulated DC to DC converter having an input connected to said first fixed DC output signal, a network of switches switched at a high frequency with a given duty cycle to convert said input into a first internal AC signal, an isolation transformer with a primary winding driven by said first internal high frequency AC signal and a secondary winding for creating a second internal high frequency AC signal and a rectifier to convert said second internal AC signal into a second fixed DC output signal of said second stage; with a magnitude related to said duty cycle of said switches; and a third stage to convert said second fixed DC output signal to a welding output for welding wherein said input stage has a regulated DC to DC converter including a boost converter having a main inductance, a main rectifier, and a power switch having an active soft switching circuit, said active soft switching circuit of said input stage comprising:
an auxiliary switching device and a tank circuit closed by said auxiliary switching device, said tank circuit comprising a resonant inductance coupled in series with said auxiliary switching device, and a resonant capacitance coupled in parallel with said power switch, said resonant capacitance having a first resonant capacitor portion coupled in parallel with said resonant inductance and a second resonant capacitor portion coupled in parallel with said auxiliary switching device.

2. A three stage power source as defined in claim 1 wherein said regulated DC to DC converter is a power factor correcting converter.

3. A three stage power source as defined in claim 1 wherein said regulated DC to DC converter is said boost converter.

4. A three stage power source as defined in claim 1 wherein said tank circuit is activated by said auxiliary switch.

5. A three stage power source as defined in claim 1 wherein said auxiliary switch is operated in unison with said power switch.

6. A three stage power source as defined in claim 1 wherein said third stage is a chopper with a power switch having a passive soft switching circuit.

7. A three stage power source as defined in claim 1 wherein said given duty cycle is greater than 80% to hold conduction losses of said second stage at a low level.

8. A three stage power source as defined in claim 1, wherein said given duty cycle is adjustable.

9. A three stage power source as defined in claim 2 wherein said regulated DC to DC power factor correcting converter includes said boost converter.

10. A three stage power source as defined in claim 2 wherein said tank circuit is activated by said auxiliary switch.

11. A three stage power source as defined in claim 2 wherein said auxiliary switch is operated in unison with said power switch.

12. A three stage power source as defined in claim 2 wherein said third stage is a chopper with a power switch having a passive soft switching circuit.

13. A three stage power source as defined in claim 2 wherein said given duty cycle is greater than 80% to hold conduction losses of said second stage at a low level.

14. A three stage power source as defined in claim 3 wherein said auxiliary switch operated in u nison with said power switch.

15. A three stage power source as defined in claim 3 wherein said tank circuit is activated by said auxiliary switch.

16. A three stage power source as defined in claim 3 wherein said third stage is a chopper with a power switch having a passive soft switching circuit.

17. A three stage power source as defined in claim 3 wherein said given duty cycle is greater than 80% to hold conduction losses of said second stage at a low level.

18. A three stage power source as defined in claim 5 wherein said main rectifier is a boost diode soft switched by said soft switching circuit.

19. A three stage power source as defined in claim 5 wherein said regulated DC to DC converter has a positive and a negative output lead with said resonant capacitance joining said leads and a diode clamping the positive end of said auxiliary switch to said positive output lead.

20. A three stage power source as defined in claim 5 wherein said third stage is a chopper with a power switch having a passive soft switching circuit.

21. A three stage power source as defined in claim 5 wherein said given duty cycle is greater than 80% to hold conduction losses of said second stage at a low level.

22. A three stage power source as defined in claim 9 wherein said tank circuit is activated by said auxiliary switch.

23. A three stage power source as defined in claim 9 wherein said auxiliary switch is operated in unison with said power switch.

24. A three stage power source as defined in claim 9 wherein said third stage is a chopper with a power switch having a passive soft switching circuit.

25. A three stage power source as defined in claim 9 wherein said given duty cycle is greater than 80% to hold conduction losses of said second stage at a low level.

26. A three stage power source as defined in claim 11 wherein said main rectifier is a boost diode soft switched by said soft switching circuit.

27. A three stage power source as defined in claim 11 wherein said regulated DC to DC converter has a positive and a negative output lead with said resonant capacitance joining said leads and a diode clamping the positive end of said auxiliary switch to said positive output lead.

28. A three stage power source as defined in claim 11 wherein said third stage is a chopper with a power switch having a passive soft switching circuit.

29. A three stage power source as defined in claim 11 wherein said given duty cycle is greater than 80% to hold conduction losses of said second stage at a low level.

30. A three stage power source as defined in claim 14 wherein said main rectifier is a boost diode soft switched by said soft switching circuit.

31. A three stage power source as defined in claim 14 wherein said tank circuit closed is activated by said auxiliary switch.

32. A three stage power source as defined in claim 14 wherein said regulated DC to DC converter has a positive and a negative output lead with said resonant capacitance joining said leads and a diode clamping the positive end of said auxiliary switch to said positive output lead.

33. A three stage power source as defined in claim 14 wherein said third stage is a chopper with a power switch having a passive soft switching circuit.

34. A three stage power source as defined in claim 14 wherein said given duty cycle is greater than 80% to hold conduction losses of said second stage at a low level.

35. A three stage power source as defined in claim 18 wherein said regulated DC to DC converter has a positive and a negative output lead with said resonant capacitance joining said leads and a diode clamping the positive end of said auxiliary switch to said positive output lead.

36. A three stage power source as defined in claim 18 wherein said third stage is a chopper with a power switch having a passive soft switching circuit.

37. A three stage power source as defined in claim 18 wherein said given duty cycle is greater than 80% to hold conduction losses of said second stage at a low level.

38. A three stage power source as defined in claim 23 wherein said main rectifier is a boost diode soft switched by said soft switching circuit.

39. A three stage power source as defined in claim 23 wherein said regulated DC to DC converter has a positive and a negative output lead with said resonant capacitance joining said leads and a diode clamping the positive end of said auxiliary switch to said positive output lead.

40. A three stage power source as defined in claim 23 wherein said third stage is a chopper with a power switch having a passive soft switching circuit.

41. A three stage power source as defined in claim 23 wherein said given duty cycle is greater than 80% to hold conduction losses of said second stage at a low level.

42. A three stage power source as defined in claim 26 wherein said regulated DC to DC converter has a positive and a negative output lead with said resonant capacitance joining said leads and a diode clamping the positive end of said auxiliary switch to said positive output lead.

43. A three stage power source as defined in claim 26 wherein said third stage is a chopper with a power switch having a passive soft switching circuit.

44. A three stage power source as defined in claim 26 wherein said given duty cycle is greater than 80% to hold conduction losses of said second stage at a low level.

45. A three stage power source as defined in claim 30 wherein said tank circuit is activated by said auxiliary switch.

46. A three stage power source as defined in claim 30 wherein said regulated DC to DC converter has a positive and a negative output lead with said resonant capacitance joining said leads and a diode clamping the positive end of said auxiliary switch to said positive output lead.

47. A three stage power source as defined in claim 31 wherein said regulated DC to DC converter has a positive and a negative output lead with said resonant capacitance joining said leads and a diode clamping the positive end of said auxiliary switch to said positive output lead.

48. A three stage power source as defined in claim 32 wherein said third stage is a chopper with a power switch having a passive soft switching circuit.

49. A three stage power source as defined in claim 32 wherein said given duty cycle is greater than 80% to hold conduction losses of said second stage at a low level.

50. A three stage power source as defined in claim 38 wherein said regulated DC to DC converter has a positive and a negative output lead with said resonant capacitance joining said leads and a diode clamping the positive end of said auxiliary switch to said positive output lead.

51. A three stage power source as defined in claim 38 wherein said third stage is a chopper with a power switch having a passive soft switching circuit.

52. A three stage power source as defined in claim 38 wherein said given duty cycle is greater than 80% to hold conduction losses of said second stage at a low level.

53. A three stage power source comprising an input first stage having an AC input and a first fixed DC output signal, a second stage in the form of an unregulated DC to DC converter having an input connected to said first fixed DC output signal, a network of switches switched at a high frequency with a given duty cycle to convert said input into a first internal AC signal, an isolation transformer with a primary winding driven by said first internal high frequency AC signal and a secondary winding for creating a second internal AC signal and a rectifier to convert said second internal AC signal into a second fixed DC output signal of said second stage, with the magnitude related to said duty cycle of said switches, wherein said input first stage includes a boost converter having a main inductance, a main rectifier, and a power switch having an active soft switching circuit and a third stage to convert said second fixed DC output signal of said second stage into a current suitable for welding, said active soft switching circuit of said input first stage including:
an auxiliary switching device and a tank circuit closed by said auxiliary switching device, said tank circuit comprising a resonant inductance coupled in series with said auxiliary switching device, and a resonant capacitance coupled in parallel with said power switch, said resonant capacitance having a first resonant capacitor portion coupled in parallel with said resonant inductance and a second resonant capacitor portion coupled in parallel with said auxiliary switching device.

54. A power source as defined in claim 53 wherein said input first stage includes a rectifier and a power factor correcting converter.

55. A power source as defined in claim 53 wherein said power switch is in said boost converter.

56. A power source as defined in claim 53 wherein said auxiliary switch is operated in unison with said power switch.

57. A power source as defined in claim 53 wherein said given duty cycle is greater than 80% to hold conduction losses of said second stage at a low level.

58. A power source as defined in claim 54 wherein said power factor correcting converter includes said boost converter operated by said power switch.

59. A power source as defined in claim 54 wherein said auxiliary switch is operated in unison with said power switch.

60. A power source as defined in claim 54 wherein said given duty cycle is greater than 80% to hold conduction losses of said second stage at a low level.

61. A power source as defined in claim 55 wherein said auxiliary switch is operated in unison with said power switch.

62. A power source as defined in claim 55 wherein said given duty cycle is greater than 80% to hold conduction losses of said second stage at a low level.

63. A power source as defined in claim 56 wherein said given duty cycle is greater than 80% to hold conduction losses of said second stage at a low level.

64. A power source, as defined in claim 56 wherein said power switch comprises a main boost switch.

65. A power source as defined in claim 58 wherein said auxiliary switch is operated in unison with said power switch.

66. A power source as defined in claim 58 wherein said given duty cycle is greater than 80% to hold conduction losses of said second stage at a low level.

67. A power source as defined in claim 59 wherein said given duty cycle is greater than 80% to hold conduction losses of said second stage at a low level.

68. A power source as defined in claim 61 wherein said given duty cycle is greater than 80% to hold conduction losses of said second stage at a low level.

69. A power source as defined in claim 64 wherein said second resonant capacitor portion is coupled in parallel with said auxiliary switch by a forward poled diode.

70. A power source as defined in claim 64 wherein said second resonant capacitor portion is substantially less than ½ the capacitance of said first resonant capacitor portion.

71. A power source as defined in claim 65 wherein said given duty cycle is greater than 80% to hold conduction losses of said second stage at a low level.

72. A power source as defined in claim 69 wherein said second resonant capacitor portion is substantially less than ½ the capacitance of said first resonant capacitance capacitor portion.

73. A three stage power source comprising an input first stage having an AC input and a first fixed DC output signal with a DC to DC converter including a boost converter having a main inductance, a main rectifier, and a power switch with an active soft switching circuit, a second stage in the form of an unregulated DC to DC inverter having a plurality of power switches, said plurality of switches operated by a pulse-width-modulated control set at a given duty cycle, and a third stage to convert a second fixed DC output of said unregulated inverter into a current suitable for welding, said active soft switching circuit of said input first stage including an auxiliary switching device and a tank circuit closed by said auxiliary switching device, said tank circuit comprising a resonant inductance coupled in series with said auxiliary switching device, and a resonant capacitance coupled in parallel with said power switch, said resonant capacitance having a first resonant capacitor portion coupled in parallel with said resonant inductance and a second resonant capacitor portion coupled in parallel with said auxiliary switching device.

74. A power source as defined in claim 73 wherein said DC to DC converter is said boost converter.

75. A power source as defined in claim 73 wherein said DC to DC converter is driven by a power factor correcting control.

76. A power source as defined in claim 73 wherein said given duty cycle of said pulse-width-modulated control is greater than 80%.

77. A power source, as defined in claim 73 wherein said power switch comprises a main boost switch.

78. A three stage power source as defined in claim 73, wherein said pulse-width-modulated control is a phase shift pulse-width-modulated control.

79. An active soft switching circuit as defined in any one of claims 1, 53 and 73, wherein the series combination of said resonant inductance and said auxiliary switching device form a first leg of said tank circuit with a first intermediate node between said resonant inductance and said auxiliary switch, wherein said first and second resonant capacitor portions form a second leg of said tank circuit with a second intermediate node between said first and second resonant capacitor portions, and wherein said tank circuit further comprises a first diode coupled between said first and second intermediate nodes and a second diode coupled between said second intermediate node and said cathode of said main rectifier.

80. A power source as defined in claim 74 wherein said DC to DC converter is driven by a power factor correcting control.

81. A power source as defined in claim 74 wherein said given duty cycle of said pulse-width-modulated control is greater than 80%.

82. A power source as defined in claim 75 wherein said given duty cycle of said pulse-width-modulated control is greater than 80%.

83. A three stage power source, as defined in claim 75 wherein said power switch comprises a main boost switch.

84. A power source as defined in claim 76 wherein said duty cycle is greater than 90%.

85. A power source as defined in claim 77 wherein said second resonant capacitor is coupled in parallel with said auxiliary switch by a forward poled diode.

86. A power source as defined in claim 77 wherein said second resonant capacitor portion is substantially less than ½ the capacitance of said first resonant capacitor portion.

87. An active soft switching circuit as defined in claim 79, wherein said first resonant capacitor portion is larger than said second resonant capacitor portion.

88. The active soft switching circuit as defined in claim 79, wherein said second resonant capacitor portion controls a rate of increase of a voltage across said auxiliary switching device when said auxiliary switching device is turned off.

89. The active soft switching circuit as defined in claim 79, wherein said second resonant capacitor portion controls a rate of increase of a voltage across said auxiliary switching device when said auxiliary switching device is turned off.

90. A power source as defined in claim 80 wherein said given duty cycle of said pulse-width-modulated control is greater than 80%.

91. A power source as defined in claim 81 wherein said duty cycle is greater than 90%.

92. A power source as defined in claim 82 wherein said duty cycle is greater than 90%.

93. A power source as defined in claim 83 wherein said second resonant capacitor portion is coupled in parallel with said auxiliary switch by a forward poled diode.

94. A power source as defined in claim 83 wherein said second resonant capacitor portion is substantially less than ½ the capacitance of said first resonant capacitor portion.

95. A power source as defined in claim 85 wherein said second resonant capacitance is substantially less than ½ the capacitance of said first resonant capacitance.

96. The active soft switching circuit as defined in claim 87, wherein said second resonant capacitor portion controls a rate of increase of a voltage across said auxiliary switching device when said auxiliary switching device is turned off.

97. A power source as defined in claim 90 wherein said duty cycle is greater than 90%.

98. A power source as defined in claim 93 wherein said second resonant capacitor portion is substantially less than ½ the capacitance of said first resonant capacitor portion.

\* \* \* \* \*